US011396165B2

(12) United States Patent
Yambe et al.

(10) Patent No.: US 11,396,165 B2
(45) Date of Patent: Jul. 26, 2022

(54) MULTILAYER FILM

(71) Applicant: RIKEN TECHNOS CORPORATION, Tokyo (JP)

(72) Inventors: Hideaki Yambe, Tokyo (JP); Kohei Nakashima, Tokyo (JP)

(73) Assignee: RIKEN TECHNOS CORPORATION ( * ) Notice: Subject to any disclaimer, the term of this patent is extended or adjusted under 35 U.S.C. 154(b) by 157 days.

(21) Appl. No.: 16/622,643

(22) PCT Filed: May 18, 2018

(86) PCT No.: PCT/JP2018/019344
§ 371 (c)(1),
(2) Date: Dec. 13, 2019

(87) PCT Pub. No.: WO2018/230260
PCT Pub. Date: Dec. 20, 2018

(65) Prior Publication Data
US 2021/0122146 A1 Apr. 29, 2021

(30) Foreign Application Priority Data

Jun. 13, 2017 (JP) .............................. JP2017-115594

(51) Int. Cl.
B32B 27/08 (2006.01)
B32B 7/027 (2019.01)
(Continued)

(52) U.S. Cl.
CPC ............. B32B 27/08 (2013.01); B32B 7/027 (2019.01); B32B 7/12 (2013.01); B32B 27/308 (2013.01);
(Continued)

(58) Field of Classification Search
CPC ........... B32B 27/08; B32B 7/027; B32B 7/12; B32B 27/308; B32B 27/365;
(Continued)

(56) References Cited

U.S. PATENT DOCUMENTS 5,055,531 A * 10/1991 Fox ........................ C08G 81/00
525/439
10,112,369 B2 10/2018 Nakashima et al.
(Continued)

FOREIGN PATENT DOCUMENTS

JP 2009196153 A 9/2009
JP WO2010024217 A 2/2010
(Continued)

OTHER PUBLICATIONS

English machine translation for JP2016-193600, Nov. 17, 2016 (Year: 2016).*

(Continued)

Primary Examiner — Michael C Miggins
(74) Attorney, Agent, or Firm — Bracewell LLP; Brad Y. Chin

(57) ABSTRACT

Embodiments provide a multilayer film in which: a first acrylic resin layer ($\alpha1$), an aromatic polycarbonate resin layer ($\beta$), and a second acrylic resin layer ($\alpha2$) are directly laminated in the stated order; the aromatic polycarbonate resin constituting the aromatic polycarbonate resin layer ($\beta$) is a product of ester exchange between a polycarbonic acid ester of an aromatic dihydroxy compound and a low-crystalline or amorphous aromatic polyester; and the relationships $(T\beta - T\alpha1) \leq 30$ and $(T\beta - T\alpha2) \leq 30$ (where $T\alpha1$ is the glass transition temperature of the acrylic resin constituting the first acrylic resin layer ($\alpha1$), $T\alpha2$ is the glass transition temperature of the acrylic resin constituting the second acrylic resin layer ($\alpha2$), $T\beta$ is the glass transition (Continued)

temperature of the aromatic polycarbonate resin constituting the aromatic polycarbonate resin layer (β), and all of the temperatures are measured in degrees Celsius) are satisfied. The glass transition temperature of the aromatic polycarbonate resin should be 100-140° C.

17 Claims, 4 Drawing Sheets

(51) Int. Cl.
  B32B 7/12      (2006.01)
  B32B 27/30     (2006.01)
  B32B 27/36     (2006.01)
  C08F 20/12     (2006.01)
  C08G 64/42     (2006.01)

(52) U.S. Cl.
  CPC ............ B32B 27/365 (2013.01); C08F 20/12 (2013.01); C08G 64/42 (2013.01); B32B 2250/03 (2013.01); B32B 2250/24 (2013.01); B32B 2307/30 (2013.01); B32B 2307/702 (2013.01)

(58) Field of Classification Search
  CPC ............ B32B 2250/03; B32B 2250/24; B32B 2307/30; C08F 20/12; C08G 64/42
  See application file for complete search history.

(56) References Cited

U.S. PATENT DOCUMENTS

| 10,118,988 | B2 | 11/2018 | Nakayasu et al. |
| 2008/0213607 | A1 | 9/2008 | Morita et al. |
| 2015/0224748 | A1* | 8/2015 | Onishi .............. B29C 45/14778 428/195.1 |
| 2016/0229159 | A1 | 8/2016 | Nakashima et al. |

FOREIGN PATENT DOCUMENTS

| JP | 2010125645 A | 6/2010 |
| JP | 2011161871 A | 8/2011 |
| JP | 2012096357 A | 5/2012 |
| JP | 2012121271 A | 6/2012 |
| JP | 2013022822 A | 2/2013 |
| JP | 2013193241 A | 9/2013 |
| JP | 2014121849 A | 7/2014 |
| JP | 2015066812 A | 4/2015 |
| JP | 2015083370 A | 4/2015 |
| JP | 2015128899 A | 7/2015 |
| JP | 2016020052 A | 2/2016 |
| JP | 2016193600 A | 11/2016 |
| JP | 2017164969 A | 9/2017 |
| JP | 2020152792 A | 9/2020 |
| KR | 20160060044 A | 5/2016 |
| TW | 201429715 A | 8/2014 |
| TW | 201634281 A | 10/2016 |
| WO | 2006132208 A | 5/2006 |
| WO | 2016052989 A1 | 4/2016 |
| WO | 2016060100 A | 4/2016 |
| WO | 2016147739 A1 | 9/2016 |
| WO | 2017030147 A1 | 2/2017 |

OTHER PUBLICATIONS

English machine translation of WO2016147739 (Year: 2016).*
JP2017-151196 First Office Action dated Dec. 22, 2020, 7 pgs.
PCT/JP2017/026872 International Search Report dated Sep. 5, 2017; 2 pgs.
EP18817498.1 Extended European Search Report dated Feb. 1, 2021, 7 pgs.
PCT/JP2018/019344 International Preliminary Report on Patentability dated Dec. 26, 2019; 19 pgs.
JP2017-151196 Third party Observations dated Sep. 15, 2020, 11 pgs.
CN201780054002.0 1st Office Action dated Sep. 21, 2020, 27 pgs.
PCT/JP2018/019344 International Search Report dated Jul. 3, 2018; 2 pgs.
EP17845961.6 Supplementary European Search Report dated Mar. 27, 2020, 10 pgs.
KR10-2019-7009384 First Office Action dated May 20, 2021, 9 pgs.
CN201880038884.6 First Office Action dated Jul. 26, 2021, 14 pgs.
TW107117990 First Office Action dated Dec. 2, 2021, 15 pgs.
Osamu, et al., Effects of Injection Molding Conditions on Replication, Birefringence and Optical Property of Microscopic V-grove Structures for Polycarbonate, Seikei-Kakou vol. 20 No. 10 2008, pp. 762-768.
JP2018-107334 Office Action dated Feb. 21, 2022, 11 pgs.

* cited by examiner

MULTILAYER FILM

CROSS REFERENCE TO RELATED APPLICATIONS

This application claims the benefit of and priority to PCT/JP2018/019344, filed on May 18, 2018, entitled (translation), "MULTILAYER FILM," which claims the benefit of and priority to Japanese Patent Application No. 2017-115594, filed on Jun. 13, 2017, which are hereby incorporated by reference in their entirety into this application.

BACKGROUND

Embodiments relate to a multilayer film. More specifically, embodiments relate to a multilayer film with suppressed warpage deformation.

DESCRIPTION OF RELATED ART

In recent years, touch panels that are installed on image display devices such as liquid crystal displays, plasma displays, and electroluminescence displays and can perform input by touching with fingers or pens or the like while viewing the display have become widespread.

Conventionally, glass-based members have been used in a display faceplate or a transparent conductive substrate of a touch panel since the glass-based members meet the required characteristics such as heat resistance, dimensional stability, high transparency, high surface hardness, and high rigidity. Meanwhile, glass has disadvantages such as low impact resistance causing breakability, low processability, difficult handling, high specific gravity, and difficulty in meeting the demands for curved display and flexibility. Therefore, hard coat laminated films have been extensively studied as a substitute for glass. As the film base material of the hard coat laminated film, from viewpoints of high surface hardness, abrasion resistance, and cutting processability, a multilayer film in which a first acrylic resin layer, an aromatic polycarbonate resin layer, and a second acrylic resin layer are directly laminated in the stated order has been often proposed. However, there is a disadvantage that it is difficult for the multilayer film to suppress warpage deformation, particularly warpage deformation after moisture and heat treatment. As a technique for suppressing warpage deformation, methods for controlling a peripheral speed of a cooling roll (see Patent Literatures 1 and 2) and a method for heating a film with a heater after passing through a cooling roll (see Patent Literature 3) have been proposed. However, these techniques are not fully satisfactory.

CITATION LIST

Patent Literature

PATENT LITERATURE 1: JP-A-2012-096357
PATENT LITERATURE 2: JP-A-2013-193241
PATENT LITERATURE 3: JP-A-2012-121271
PATENT LITERATURE 4: JP-A-2015-083370

SUMMARY

An object of the various embodiments is to provide a multilayer film in which warpage deformation, particularly warpage deformation after moisture and heat treatment, is suppressed. Another object of the various embodiments is to provide a multilayer film in which warpage deformation, particularly warpage deformation after moisture and heat treatment, is suppressed, and which is excellent in transparency, color tone and appearance, and has a small retardation, and preferably has a low water absorption.

As a result of intensive research, the present inventors have found that the above objects could be achieved by making glass transition temperatures of raw material resins satisfy specific relational expressions.

Various aspects of the various embodiments for solving the problems are as follows.

According to an embodiment, there is provided a multilayer film including: a first acrylic resin layer ($\alpha 1$); an aromatic polycarbonate resin layer ($\beta$); and a second acrylic resin layer ($\alpha 2$), where the first acrylic resin layer ($\alpha 1$), the aromatic polycarbonate resin layer ($\beta$), and the second acrylic resin layer ($\alpha 2$) are directly laminated in the stated order, an aromatic polycarbonate resin constituting the aromatic polycarbonate resin layer ($\beta$) is a product of ester exchange between a polycarbonic acid ester of an aromatic dihydroxy compound and a low-crystalline or amorphous aromatic polyester, and the multilayer film satisfies the following formulae (1-1) and (1-2):

$$(T\beta - T\alpha_1) \leq 30 \tag{1-1}$$

$$(T\beta - T\alpha_2) \leq 30 \tag{1-2},$$

where $T\alpha_1$ is a glass transition temperature of an acrylic resin constituting the first acrylic resin layer ($\alpha 1$), $T\alpha_2$ is a glass transition temperature of an acrylic resin constituting the second acrylic resin layer ($\alpha 2$), $T\beta$ is a glass transition temperature of an aromatic polycarbonate resin constituting the aromatic polycarbonate resin layer ($\beta$), and all of the temperatures are determined in ° C.

According to an embodiment, the glass transition temperature of the aromatic polycarbonate resin constituting the aromatic polycarbonate resin layer ($\beta$) is 100-140° C.

According to an embodiment, the polycarbonic acid ester of the aromatic dihydroxy compound is a polycarbonic acid ester of bisphenol A.

According to an embodiment, the low-crystalline or amorphous aromatic polyester is comprised of: (1) a structural unit derived from terephthalic acid in an amount of 90-100 mol % based on 100 mol % of the total sum of structural units derived from polycarboxylic acid; and (2) a structural unit derived from ethylene glycol in an amount of 20-80 mol %, a structural unit derived from 1,4-cyclohexanedimethanol in an amount of 20-80 mol %, and a structural unit derived from diethylene glycol in an amount of 0 to 10 mol % based on 100 mol % of the total sum of structural units derived from polyol.

According to another embodiment, there is provided a multilayer film including: a first acrylic resin layer ($\alpha 1$); an aromatic polycarbonate resin layer ($\beta$); and a second acrylic resin layer ($\alpha 2$), where the first acrylic resin layer ($\alpha 1$), the aromatic polycarbonate resin layer ($\beta$), and the second acrylic resin layer ($\alpha 2$) are directly laminated in the stated order, an aromatic polycarbonate resin constituting the aromatic polycarbonate resin layer ($\beta$) is comprised of a structural unit derived from an aromatic dihydroxy compound in an amount of 15-80 mol %, a structural unit derived from terephthalic acid in an amount of 10-42 mol %, a structural unit derived from 1,4-cyclohexanedimethanol in an amount of 3-25 mol %, and a structural unit derived from ethylene glycol in an amount of 4-30 mol % based on 100 mol % of the total sum of structural units derived from all constituent monomers, and the multilayer film satisfies the following formulae (1-1) and (1-2):

$$(T\beta - T\alpha_1) \leq 30 \quad (1\text{-}1)$$

$$(T\beta - T\alpha_2) \leq 30 \quad (1\text{-}2),$$

where $T\alpha_1$ is a glass transition temperature of an acrylic resin constituting the first acrylic resin layer ($\alpha 1$), $T\alpha_2$ is a glass transition temperature of an acrylic resin constituting the second acrylic resin layer ($\alpha 2$), $T\beta$ is a glass transition temperature of an aromatic polycarbonate resin constituting the aromatic polycarbonate resin layer ($\beta$), and all of the temperatures are determined in ° C.

According to an embodiment, the aromatic polycarbonate resin constituting the aromatic polycarbonate resin layer ($\beta$) is comprised of a structural unit derived from bisphenol A in an amount of 15-80 mol %, a structural unit derived from terephthalic acid in an amount of 10-42 mol %, a structural unit derived from 1,4-cyclohexanedimethanol in an amount of 3-25 mol %, and a structural unit derived from ethylene glycol in an amount of 4-30 mol % based on 100 mol % of the total sum of the structural units derived from all constituent monomers.

According to an embodiment, the acrylic resin constituting the first acrylic resin layer ($\alpha 1$) and the acrylic resin constituting the second acrylic resin layer ($\alpha 2$) are the same acrylic resin, and the acrylic resin is comprised of a structural unit derived from methyl (meth)acrylate in an amount of 50-95 mol %, and a structural unit derived from vinylcyclohexane in an amount of 50-5 mol % based on 100 mol % of the total sum of structural units derived from polymerizable monomers.

According to an embodiment, the multilayer film satisfies the following properties (i) and (ii): (i) a total light transmittance is 85% or more; and (ii) a retardation is 75 nm or less.

According to an embodiment, the multilayer film further satisfies the following property (iii): (iii) a water absorption measured under a condition of an immersion time of 24 hours is 1% by mass or less according to a method A in JIS K7209:2009.

According to another embodiment, there is provided a hard coat laminated film including a hard coat on at least one surface of the multilayer film according to various embodiments.

According to another embodiment, there is provided an article including the film according to various embodiments.

In a multilayer film of the various embodiments, warpage deformation, particularly warpage deformation after moisture and heat treatment can be suppressed. In a preferred multilayer film of the various embodiments, warpage deformation, particularly warpage deformation after moisture and heat treatment, can be suppressed, and the multilayer film can be excellent in transparency, color tone and appearance, and also have a small retardation and a low water absorption. When the multilayer film of the various embodiments is used as a film substrate, preferably, it is possible to obtain a hard coat laminated film that is excellent in transparency, color tone, appearance and low water absorption, and is excellent in one or a plurality of properties of surface hardness, abrasion resistance, cutting processability, and crack resistance, and is suitable as a member of an image display device such as a liquid crystal display, a plasma display, and an electroluminescence display (including an image display device having a touch panel function and an image display device having no touch panel function), particularly as a display faceplate of an image display device having a touch panel function.

DETAILED DESCRIPTION

Figure 1:
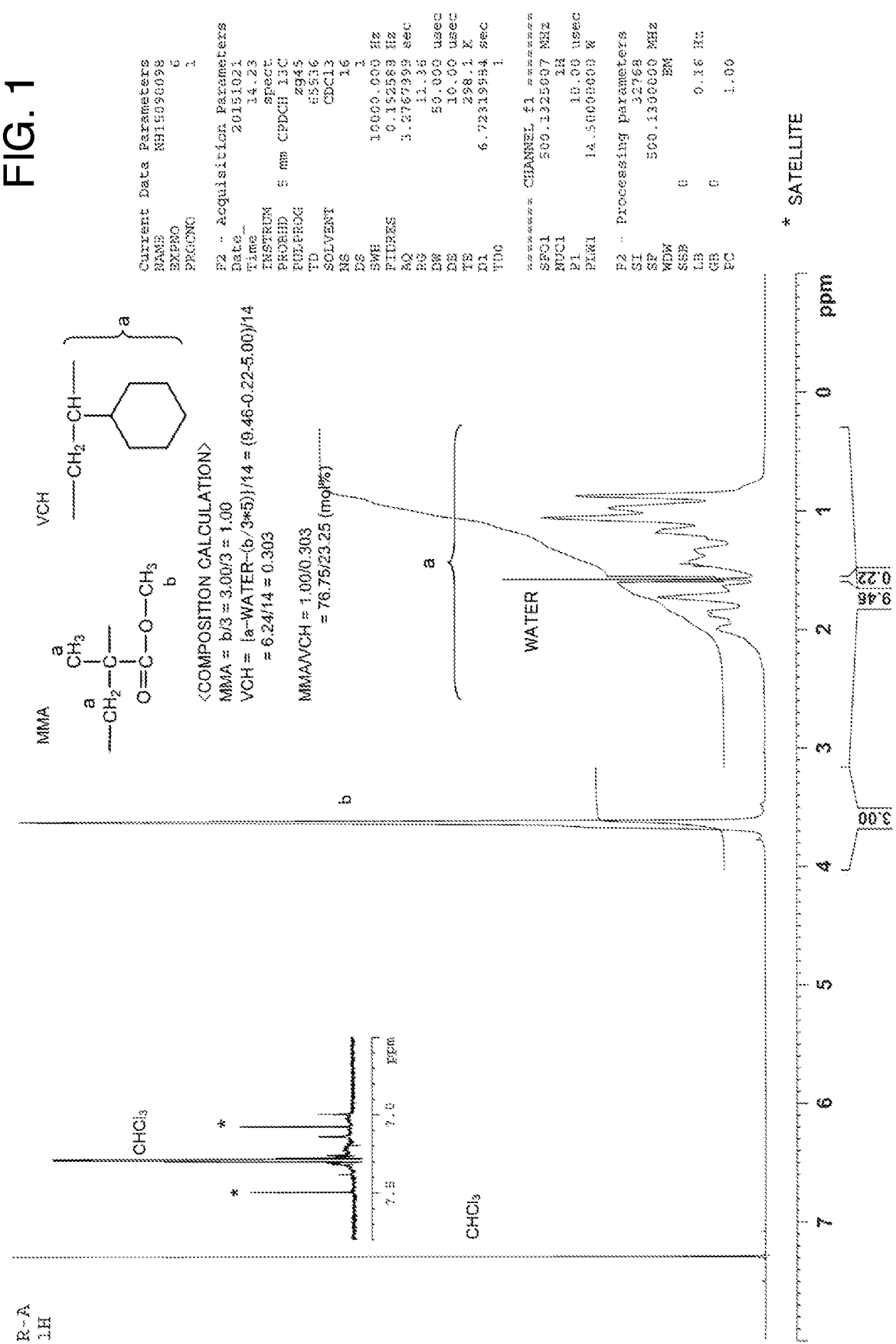
FIG. 1 is a $^1$H-NMR spectrum of an acrylic resin ($\alpha$-1) used in Examples.

In the present specification, the term "film" is used mutually changeably or mutually replaceably with "sheet". In the present specification, the terms "film" and "sheet" are used in those which can be industrially rolled up. The term "plate" is used in those which cannot be industrially rolled up. The term "resin" is used as a term including a resin mixture containing two or more resins, and a resin composition containing a component(s) other than resins. In the present specification, sequentially laminating one layer and another layer means both directly laminating the layers and laminating the layers by interposing one or more layers, such as an anchor coat, between the layers.

The term "or more" for a numerical range is used to mean a certain numerical value or a numerical value exceeding the certain numerical value. For example, 20% or more means 20% or a value exceeding 20%. The term "or less" for a numerical range is used to mean a certain numerical value or a numerical value less than the certain numerical value. For example, 20% or less means 20% or a value less than 20%. Furthermore, the symbol "–" (or "to") for a numerical range is used to mean a certain numerical value, a numerical value greater than the certain numerical value and less than another numerical value, or the other numerical value. Here, the other numerical value is a numerical value greater than the certain numerical value. For example, 10-90% means 10%, greater than 10% and less than 90%, or 90%.

Except for Examples or unless otherwise specified, all numerical values used in the present specification and claims should be understood as being modified by the term "about". Without intending to limit the application of the doctrine of equivalents to the scope of the claims, each numerical value should be interpreted in light of significant figures and by applying ordinary rounding techniques.

In the following, in many cases, for the sake of simplicity, an acrylic resin constituting a first acrylic resin layer ($\alpha 1$) may be simply referred to as a "first acrylic resin"; an aromatic polycarbonate resin constituting an aromatic polycarbonate resin layer ($\beta$) may be simply referred to as an "aromatic polycarbonate resin"; and an acrylic resin constituting a second acrylic resin layer ($\alpha 2$) may be simply referred to as a "second acrylic resin". The "first acrylic resin" and the "second acrylic resin" may be identical to or different from each other, but these may be collectively referred to as an "acrylic resin".

1. Multilayer Film

In the multilayer film of the various embodiments, the first acrylic resin layer ($\alpha 1$); the aromatic polycarbonate resin layer ($\beta$); and the second acrylic resin layer ($\alpha 2$) are directly laminated in the stated order.

The acrylic resin is excellent in surface hardness, but it tends to be insufficient in cutting processability. The aromatic polycarbonate resin is excellent in cutting processability, but tends to be insufficient in surface hardness. Therefore, due to the above-described layer structure, it is possible to easily obtain the multilayer film that is excellent in both surface hardness and cutting processability by supplementing the weak points of the two resins.

The layer thickness of the (α1) layer is not particularly limited, but from a viewpoint of the surface hardness, it may be usually 10 μm or more, preferably 20 μm or more, more preferably 40 μm or more, and still more preferably 60 μm or more.

The layer thickness of the (α2) layer is not particularly limited, but from a viewpoint of suppressing the warpage deformation, it is preferable that the layer thickness is the same as that of the (α1) layer.

Here, "the same layer thickness" should not be interpreted as the same layer thickness in a physicochemically strict sense. It should be interpreted as the same layer thickness within the range of the deflection width of the process/quality control which is usually performed industrially. If the two layers have the same layer thickness within the range of the deflection width of the process/quality control which is usually performed industrially, the warpage deformation of the multilayer film can be sufficiently suppressed. In the case of an unstretched multilayer film by a T die coextrusion method, for example, when the set layer thickness is 70 μm, since the process and quality control is usually performed with a width of about −5 to +5 μm, the layer thickness of 65 μm and the thickness of 75 μm should be interpreted as the same. Here, the "same layer thickness" is also referred to as "substantially the same layer thickness".

The layer thickness of the (β) layer is not particularly limited, but from a viewpoint of the cutting processability, it may be usually 20 μm or more, and preferably 80 μm or more.

The upper limit of the layer thickness of the (α1) layer itself, the (α2) layer itself, or the (β) layer itself is not particularly limited, but it may be determined by the preferable range of the thickness of the entire multilayer film as described later.

The total thickness of the multilayer film is not particularly limited and can be set to any thickness as desired. From a viewpoint of handleability of the multilayer film, the total thickness of the multilayer film may be usually 20 μm or more, and preferably 50 μm or more. When the multilayer film is used for applications not requiring high rigidity, the total thickness of the multilayer film may be usually 250 μm or less, and preferably 150 μm or less from a viewpoint of economic performance. When the multilayer film is used as a display faceplate, the total thickness of the multilayer film may be usually 300 μm or more, preferably 500 μm or more, and more preferably 600 μm or more from a viewpoint of maintaining the rigidity. From a viewpoint of meeting the demand for reducing the thickness of the device, the total thickness of the multilayer film may be usually 1,500 μm or less, preferably 1,200 μm or less, and more preferably 1,000 μm or less.

The first acrylic resin of the (α1) layer and the second acrylic resin of the (α2) layer will be described.

The acrylic resins constituting the (α1) layer and the (α2) layer are not particularly limited, but examples thereof include a (meth)acrylic acid ester (co)polymer, a copolymer comprised mainly of a structural unit derived from a (meth) acrylic acid ester (usually 50 mol % or more, preferably 65 mol % or more, and more preferably 70 mol % or more), and modified products thereof. The term "(meth)acrylic" means acrylic or methacrylic. The (co)polymer means a polymer (homopolymer) or a copolymer.

Examples of the (meth)acrylic acid ester (co)polymer include poly(methyl (meth)acrylate), poly(ethyl (meth)acrylate), poly(propyl (meth)acrylate), poly(butyl (meth)acrylate), a methyl (meth)acrylate-butyl (meth)acrylate copolymer, and an ethyl (meth)acrylate-butyl (meth)acrylate copolymer.

Examples of the copolymer comprised mainly of the structural unit derived from (meth)acrylic acid ester include an ethylene-methyl (meth)acrylate copolymer, a styrene-methyl (meth)acrylate copolymer, a vinylcyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by reacting with an imidizing agent (for example, methylamine, cyclohexylamine, ammonia, or the like), which is hereinafter sometimes referred to as a poly(meth) acrylimide resin.

The acrylic resin is preferably a vinylcyclohexane-methyl (meth)acrylate copolymer. By using this, it is possible to obtain a multilayer film which is excellent in transparency, color tone, appearance, and moisture resistance, and is small in retardation.

The acrylic resin is more preferably a vinylcyclohexane-methyl (meth)acrylate copolymer comprised of 50-95 mol %, preferably 65-90 mol %, and more preferably 70-85 mol % of a structural unit derived from methyl (meth)acrylate (hereinafter, sometimes abbreviated as MA/MMA unit), and 50-5 mol %, preferably 35-10 mol %, and more preferably 30-15 mol % of a structural unit derived from vinylcyclohexane (hereinafter, sometimes abbreviated as VCH unit) based on 100 mol % of the total sum of structural units derived from polymerizable monomers. Here, the sum of the MA/MMA unit content and the VCH unit content may be usually 80 mol % or more, preferably 90 mol % or more, more preferably 95 mol % or more, and still more preferably 99 mol % or more and 100 mol % or less. Here, the term "polymerizable monomers" means methyl (meth)acrylate, vinylcyclohexane, and monomers copolymerizable therewith. The copolymerizable monomer is usually a compound having a carbon-carbon double bond, and is typically a compound having an ethylenic double bond such as acrylic acid, methacrylic acid, a (meth)acrylic acid ester (excluding methyl (meth)acrylate), ethylene, propylene, and styrene.

The content of each structural unit such as MA/MMA unit or VCH unit in the vinylcyclohexane-methyl (meth)acrylate copolymer can be obtained by using $^1$H-NMR and $^{13}$C-NMR. The $^1$H-NMR spectrum can be measured, for example, by dissolving 15 mg of a sample in 0.6 mL of a chloroform-$d_1$ solvent and using a 500 MHz nuclear magnetic resonance apparatus under the following conditions.

FIG. 1 illustrates an example of measurement of the $^1$H-NMR spectrum of the acrylic resin (α-1) used in Examples described later.

Chemical shift reference: automatic setting by apparatus
Measurement mode: single pulse
Pulse width: 45° (5.0 μs)
Number of points: 32 K
Measurement range: 15 ppm (−2.5 to 12.5 ppm)
Repeat time: 10.0 seconds Number of integrations: 16 times
Measurement temperature: 25° C.
Window function: exponential (BF: 0.16 Hz)

Figure 2:
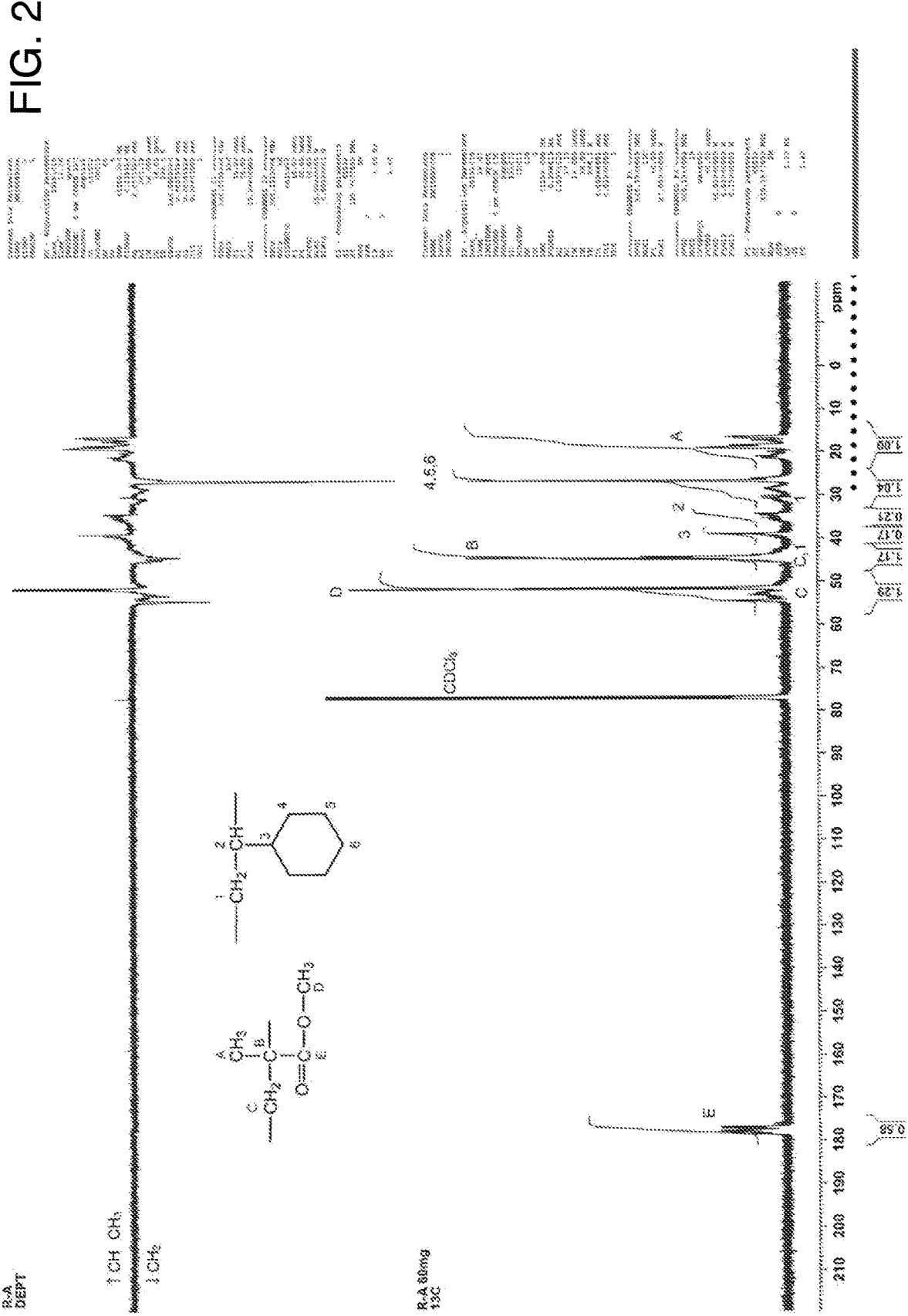
FIG. 2 is a $^{13}$C-NMR spectrum of an acrylic resin ($\alpha$-1) used in Examples.

The $^{13}$C-NMR spectrum can be measured, for example, by dissolving 60 mg of a sample in 0.6 mL of a chloroform-$d_1$ solvent and using a 125 MHz nuclear magnetic resonance apparatus under the following conditions. FIG. 2 illustrates an example of measurement of the $^{13}$C-NMR spectrum of the acrylic resin (α-1) used in Examples described later.

Chemical shift reference: automatic setting by apparatus
Measurement mode: single pulse proton broadband decoupling
Pulse width: 45° (5.0 μs)
Number of points: 64 K
Measurement range: 250 ppm (−25 to 225 ppm)
Repeat time: 5.5 seconds
Number of integrations: 128 times
Measurement temperature: 25° C.
Window function: exponential (BF: 1.00 Hz)

Peak attribution can be performed with reference to "Polymer Analysis Handbook (First edition, vol. 1, Sep. 20, 2008, Edited by the Polymer Analytical Council of Japan Analytical Chemistry, Asakura Shoten Co., Ltd.)" or "NMR database of Materials Information Station (National Institute for Materials Science and Technology, http://polymer.nims.go.jp/NMR/)", and the ratio of each structural unit in the acrylic resin constituting the (α1) layer and the (α2) layer can be calculated from the peak area ratio. The measurements of $^1$H-NMR and $^{13}$C-NMR can also be performed at an analytical institution such as Mitsui Chemical Analysis Center, Inc.

The method for producing the vinylcyclohexane-methyl (meth)acrylate copolymer is not particularly limited, and a known method can be used.

The vinylcyclohexane-methyl (meth)acrylate copolymer may be a resin mixture containing two or more kinds. In the case of the resin mixture, the MA/MMA unit content and the VCH unit content as the mixture may fall within the above-described ranges. Preferably, the MA/MMA unit content and the VCH unit content may fall within the above-described range for any of the acrylic resins constituting the mixture.

As the acrylic resin, one of these resins or a mixture of two or more thereof can be used.

From viewpoints of warpage deformation suppression and heat resistance, the glass transition temperature of the acrylic resin may be preferably 100° C. or higher, more preferably 110° C. or higher, and still more preferably 115° C. or higher.

The term "glass transition temperature" as used in the present specification is a midpoint glass transition temperature calculated from a curve of a last temperature increase process measured by a program that uses a Diamond DSC type differential scanning calorimeter manufactured by Perkin Elmer Japan Co., Ltd., according to JIS K7121-1987, to be kept at 250° C. for 3 minutes, cooled to 20° C. at 10° C./min, kept at 20° C. for 3 minutes, and increases the temperature to 250° C. at 10° C./min As desired, the acrylic resin may contain a core-shell rubber as long as it does not contradict the purpose of the various embodiments. When the core-shell rubber is used in an amount of usually 0-50 parts by mass, and preferably 3-30 parts by mass, based on 100 parts by mass of the acrylic resin, the cutting processability and impact resistance can be enhanced.

Examples of the core-shell rubber include a methacrylic acid ester-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylic acid ester graft copolymer, a methacrylic acid ester/acrylic acid ester rubber graft copolymer, a methacrylic acid ester-styrene/acrylic acid ester rubber graft copolymer, and a methacrylic acid ester-acrylonitrile/acrylic acid ester rubber graft copolymer. As the core-shell rubber, one of these rubbers or a mixture of two or more thereof can be used.

As desired, the acrylic resin can further contain: a thermoplastic resin other than the acrylic resin or the core-shell rubber; a pigment, an inorganic filler, an organic filler, or a resin filler; and an additive such as a lubricant, an antioxidant, a weather resistance stabilizer, a heat stabilizer, a release agent, an antistatic agent, and a surfactant as long as it does not contradict the purpose of the various embodiments. The blending amount of the optional component(s) is usually about 0.01-10 parts by mass based on 100 parts by mass of the acrylic resin.

Preferable examples of the above optional components include a release agent. The release agent is usually used in an amount of 0.01-1 part by mass, and preferably 0.02-0.1 part by mass, based on 100 parts by mass of the acrylic resin, whereby troubles such as adhesion of the molten film to first, second, and third mirror-finished bodies described later, and the like can be suppressed.

The first acrylic resin used for the (α1) layer and the second acrylic resin used for the (α2) layer may be different acrylic resins, for example, acrylic resins that are different in kind, composition, melt mass flow rate, and glass transition temperature and the like. From a viewpoint of suppressing warpage deformation, it is preferable to use the same acrylic resin. For example, the use of the same lot of the same grade is one of preferred embodiments.

The aromatic polycarbonate resin of the (β) layer will be described.

The aromatic polycarbonate resin is a polymer comprised of a structural unit derived from an aromatic dihydroxy compound and a structural unit derived from polycarboxylic acid; and preferably a polymer comprised of a structural unit derived from an aromatic dihydroxy compound, a structural unit derived from polycarboxylic acid, and a structural unit derived from aliphatic polyol. The aromatic polycarbonate resin is typically a product of ester exchange between a polycarbonic acid ester of an aromatic dihydroxy compound and a low-crystalline or amorphous aromatic polyester.

From a viewpoint of suppressing warpage deformation, the glass transition temperature of the aromatic polycarbonate resin may be preferably 140° C. or lower, and more preferably 130° C. or lower. Meanwhile, from a viewpoint of heat resistance, the glass transition temperature of the aromatic polycarbonate resin may be preferably 100° C. or higher, and more preferably 110° C. or higher. In one embodiment, the glass transition temperature of the aromatic polycarbonate resin may be usually 100° C. or higher and 140° C. or lower, preferably 100° C. or higher and 130° C. or lower, 110° C. or higher and 140° C. or lower, or 110° C. or higher and 130° C. or lower.

The term "glass transition temperature" as used in the present specification is a midpoint glass transition temperature calculated from a curve of a last temperature increase process measured by a program that uses a Diamond DSC type differential scanning calorimeter manufactured by Perkin Elmer Japan Co., Ltd., according to JIS K7121-1987, to be kept at 250° C. for 3 minutes, cooled to 20° C. at 10° C./min, kept at 20° C. for 3 minutes, and increases the temperature to 250° C. at 10° C./min.

The polycarbonic acid ester of the aromatic dihydroxy compound is a polymer having a structure in which an aromatic dihydroxy compound and carbonic acid are polycondensed. The polycarbonic acid ester of the aromatic dihydroxy compound can be obtained, for example, by an interfacial polymerization method of an aromatic dihydroxy compound and phosgene, or an ester exchange reaction between an aromatic dihydroxy compound and a carbonic acid diester such as diphenyl carbonate.

Examples of the aromatic dihydroxy compound include bisphenol A (2,2-bis(4-hydroxyphenyl)propane), 2,2-bis(4-hydroxy-3-methylphenyl)propane, 2,2-bis(4-hydroxy-3,5-dimethylphenyl)propane, 2,2-bis(4-hydroxy-3,5-diethylphenyl)propane, 2,2-bis(4-hydroxyphenyl)pentane, 3,3-bis(4-hydroxyphenyl)pentane, 1,1-bis(4-hydroxyphenyl)cyclohexane, 1,1-bis(4-hydroxyphenyl)-3,3,5-trimethylcyclohexane, and 1,1-bis(4-hydroxy-3-methylphenyl)cyclohexane. Among these, bisphenol A is preferable from viewpoints of cutting processability, impact resistance, toughness, and moldability. As the aromatic dihydroxy compound, one of these compounds or a mixture of two or more thereof can be used.

The low-crystalline or amorphous aromatic polyester is a polyester copolymer of aromatic polycarboxylic acid and aliphatic polyol, a polyester copolymer of aliphatic polycarboxylic acid and aromatic polyol, or a polyester copolymer of aromatic polycarboxylic acid and aromatic polyol, which is a low-crystalline or amorphous polyester. The low-crystalline or amorphous aromatic polyester is preferably a low-crystalline or amorphous polyester which is a polyester copolymer of aromatic polycarboxylic acid and aliphatic polyol.

In the present specification, in a melting curve obtained by DSC measurement with a temperature program in which the temperature of a sample is held at 320° C. for five minutes, then lowered to −50° C. at a temperature falling rate of 20° C./min, held at −50° C. for five minutes, and then raised to 320° C. at a temperature rising rate of 20° C./min using a Diamond DSC type differential scanning calorimeter manufactured by Perkin Elmer Japan Co., Ltd, a polyester having a heat of fusion of 5 J/g or less is defined as an amorphous polyester, and a polyester having a heat of fusion of more than 5 J/g and usually 60 J/g or less, preferably 40 J/g or less, more preferably 20 J/g or less, still more preferably 15 J/g or less, and most preferably 10 J/g or less is defined as a low-crystalline polyester.

Examples of the aromatic polycarboxylic acid include aromatic dicarboxylic acids such as terephthalic acid, isophthalic acid, orthophthalic acid, and naphthalenedicarboxylic acid; and ester-forming derivatives thereof. As the aromatic polycarboxylic acid, one of these aromatic polycarboxylic acids or a mixture of two or more thereof can be used.

Examples of the aliphatic polycarboxylic acid include: linear aliphatic dicarboxylic acids such as adipic acid, pimelic acid, suberic acid, azelaic acid, sebacic acid, undecane dicarboxylic acid, dodecane dicarboxylic acid, tridecanedicarboxylic acid, tetradecanedicarboxylic acid, pentadecane dicarboxylic acid, hexadecane dicarboxylic acid, octadecane dicarboxylic acid, and eicosanedicarboxylic acid; alicyclic dicarboxylic acids such as 1,3-cyclohexanedicarboxylic acid, 1,4-cyclohexanedicarboxylic acid, dicyclohexane methane-4,4'-dicarboxylic acid, and norbornanedicarboxylic acid; and ester-forming derivatives thereof. As the aliphatic polycarboxylic acid, one of these aliphatic polycarboxylic acids or a mixture of two or more thereof can be used.

Examples of the aliphatic polyol include: aliphatic diols such as ethylene glycol, diethylene glycol, neopentyl glycol, 1,2-butanediol, 1,3-butanediol, 1,4-butanediol, 1,5-pentanediol, 3-methyl-1,5-pentanediol, 2-methyl-1,3-propanediol, 1,4-cyclohexanedimethanol, 2,2,4,4,-tetramethyl-1,3-cyclobutanediol, and spiroglycol(3,9-bis(2-hydroxy-1,1-dimethylethyl)-2,4,8,10-tetraoxaspiro[5,5]undecane); and ester-forming derivatives thereof. As the aliphatic polyol, one of these aliphatic polyols or a mixture of two or more thereof can be used.

Examples of the aromatic polyol include aromatic polyols such as xylylene glycol, 4,4'-dihydroxybiphenyl, 2,2-bis(4-hydroxyphenyl)propane, bis(4-hydroxyphenyl)sulfone, bisphenol A, and alkylene oxide adducts of bisphenol A; and ester-forming derivatives thereof. As the aromatic polyol, one of these aromatic polyols or a mixture of two or more thereof can be used.

Examples of the amorphous or low-crystalline aromatic polyester resin include one or a mixture of two or more of the followings: a glycol-modified polyethylene terephthalate (PETG) comprised of 90-100 mol % of a structural unit derived from terephthalic acid based on 100 mol % of the total sum of structural units derived from polycarboxylic acid, and comprised of 60-80 mol % of a structural unit derived from ethylene glycol, 20-40 mol % of a structural unit derived from 1,4-cyclohexanedimethanol, and 0-10 mol % of a structural unit derived from diethylene glycol based on 100 mol % of the total sum of structural units derived from polyol; a glycol-modified polyethylene terephthalate (PCTG) comprised of 90-100 mol % of a structural unit derived from terephthalic acid based on 100 mol % of the total sum of structural units derived from polycarboxylic acid, and comprised of 20-60 mol %, typically 32-42 mol % of a structural unit derived from ethylene glycol, 40-80 mol %, typically 58-68 mol % of a structural unit derived from 1,4-cyclohexanedimethanol, and 0-10 mol % of a structural unit derived from diethylene glycol based on 100 mol % of the total sum of structural units derived from polyol; an acid-modified polycyclohexylenedimethylene terephthalate (PCTA) comprised of 50-99 mol % of a structural unit derived from terephthalic acid and 1-50 mol % of a structural unit derived from isophthalic acid based on 100 mol % of the total sum of structural units derived from polycarboxylic acid, and comprised of 90-100 mol % of a structural unit derived from 1,4-cyclohexanedimethanol based on 100 mol % of the total sum of structural units derived from polyol; a copolymer comprised of 90-100 mol % of a structural unit derived from terephthalic acid and 0-10 mol % of a structural unit derived from isophthalic acid based on 100 mol % of the total sum of structural units derived from polycarboxylic acid and comprised of 50-90 mol % of a structural unit derived from 1,4-cyclohexanedimethanol and 10-50 mol % of a structural unit derived from 2,2,4,4,-tetramethyl-1,3-cyclobutanediol based on 100 mol % of the total sum of structural units derived from polyol; and an acid-modified and glycol-modified polyethylene terephthalate comprised of 60-90 mol % of a structural unit derived from terephthalic acid and 10-40 mol % of a structural unit derived from isophthalic acid based on 100 mol % of the total sum of structural units derived from polycarboxylic acid and comprised of 70-96 mol % of a structural unit derived from ethylene glycol, 4-30 mol % of a structural unit derived from neopentyl glycol, less than 1 mol % of a structural unit derived from diethylene glycol, and less than 1 mol % of a structural unit derived from bisphenol A based on 100 mol % of the total sum of the structural units derived from polyol.

Among these, PETG and PCTG are preferable from a viewpoint of setting the glass transition temperature of the aromatic polycarbonate resin to 100-140° C. Among these, from a viewpoint of setting the glass transition temperature of the aromatic polycarbonate resin to 100-140° C., preferred is a glycol-modified polyethylene terephthalate comprised of 90-100 mol % of a structural unit derived from terephthalic acid based on 100 mol % of the total sum of the structural units derived from polycarboxylic acid and comprised of 20-80 mol % of a structural unit derived from ethylene glycol, 20-80 mol % of a structural unit derived from 1,4-cyclohexanedimethanol, and 0-10 mol % of a structural unit derived from diethylene glycol based on 100 mol % of the total sum of structural units derived from polyol. Here, the sum of the structural unit derived from ethylene glycol, the structural unit derived from 1,4-cyclohexanedimethanol, and the structural unit derived from diethylene glycol may be usually 80 mol % or more, preferably 90 mol % or more, more preferably 95 mol % or more, and still more preferably 99 mol % or more and 100 mol % or less.

As the amorphous or low-crystalline aromatic polyester resin, one of these resins or a mixture of two or more thereof can be used.

From a viewpoint of setting the glass transition temperature of the aromatic polycarbonate resin to 100-140° C., the glass transition temperature of the amorphous or low-crystalline aromatic polyester resin may be usually 50-140° C., preferably 60-120° C., more preferably 70-110° C., and still more preferably 75-105° C. The definition of the glass transition temperature and the measurement method thereof have been described above. In one embodiment, the glass transition temperature of the amorphous or low-crystalline aromatic polyester resin may be preferably 50-120° C., 50-110° C., 50-105° C., 60-140° C., 60-110° C., 60-105° C., 70-140° C., 70-120° C., 70-105° C., 75-140° C., 75-120° C., or 75-110° C.

A method for producing a product of ester exchange using the polycarbonic acid ester of the aromatic dihydroxy compound and the low-crystalline or amorphous aromatic polyester is not particularly limited, and known methods can be used. In the production, known ester exchange reaction catalysts, for example, alkali metal salts such as a sodium salt, a lithium salt, and a potassium salt; alkaline earth metal salts such as a magnesium salt and a calcium salt; and a zinc compound and a manganese compound and the like can be used. Examples of the method include a method for melt-extruding a composition containing the polycarbonic acid ester of the aromatic dihydroxy compound and the low-crystalline or amorphous aromatic polyester; or a composition containing 100 parts by mass in total of the polycarbonic acid ester of the aromatic dihydroxy compound and the low-crystalline or amorphous aromatic polyester and 0.0001-0.2 parts by mass of an ester exchange reaction catalyst at a die outlet resin temperature of 200-300° C., preferably 240-280° C. using a twin screw extruder.

From a viewpoint of setting the glass transition temperature of the aromatic polycarbonate resin to 100-140° C., the blending ratio of the polycarbonic acid ester of the aromatic dihydroxy compound to the low-crystalline or amorphous aromatic polyester in the ester exchange reaction may be usually 30-90% by mass, preferably 50-85% by mass, and more preferably 60-80% by mass based on 100% by mass of the total of both the polycarbonic acid ester and the aromatic polyester. Correspondingly, the ratio of the low-crystalline or amorphous aromatic polyester may be usually 70-10% by mass, preferably 50-15% by mass, and more preferably 40-20% by mass.

From a viewpoint of setting the glass transition temperature to 100-140° C., examples of the aromatic polycarbonate resin include an aromatic polycarbonate resin comprised of usually 15-80 mol %, preferably 30-70 mol %, more preferably 40-65 mol %, and still more preferably 50-60 mol % of a structural unit derived from an aromatic dihydroxy compound (e.g., bisphenol A) (including both a structural unit derived from polycondensation of an aromatic dihydroxy compound and carbonic acid, and a structural unit derived from ester polycondensation of an aromatic dihydroxy compound and a polycarboxylic acid: the same hereinafter) based on 100 mol % of the total sum of structural units derived from all constituent monomers; an aromatic polycarbonate resin comprised of usually 15-80 mol %, preferably 30-70 mol %, more preferably 40-65 mol %, and still more preferably 50-60 mol % of a structural unit derived from an aromatic dihydroxy compound (e.g., bisphenol A), usually 10-42 mol %, preferably 14-35 mol %, more preferably 17-31 mol %, and still more preferably 20-28 mol % of a structural unit derived from terephthalic acid (hereinafter sometimes abbreviated as "TPA unit"), usually 3-25 mol %, preferably 4-19 mol %, more preferably 5-17 mol %, and still more preferably 6 to 15 mol % of a structural unit derived from 1,4-cyclohexanedimethanol (hereinafter sometimes abbreviated as "CHDM unit"), and usually 4-30 mol %, preferably 6-25 mol %, more preferably 8-21 mol %, and still more preferably 9-20 mol % of a structural unit derived from ethylene glycol (hereinafter sometimes abbreviated as "EG unit"); an aromatic polycarbonate resin comprised of usually 15-80 mol %, preferably 30-70 mol %, more preferably 40-65 mol %, and still more preferably 50-60 mol % of a structural unit derived from an aromatic dihydroxy compound (e.g., bisphenol A), usually 10-42 mol %, preferably 14-35 mol %, more preferably 17-30 mol %, and still more preferably 20-27 mol % of a TPA unit, usually 5-25 mol %, preferably 7-19 mol %, more preferably 9-17 mol %, and still more preferably 11-15 mol % of a CHDM unit, and usually 4-19 mol %, preferably 6-16 mol %, more preferably 8-14 mol %, and still more preferably 9-12 mol % of an EG unit; an aromatic polycarbonate resin comprised of usually 15-80 mol %, preferably 30-70 mol %, more preferably 40-65 mol %, and still more preferably 50-60 mol % of a structural unit derived from an aromatic dihydroxy compound (e.g., bisphenol A), usually 10-42 mol %, preferably 14-35 mol %, more preferably 18-31 mol %, and still more preferably 21-28 mol % of a TPA unit, usually 3-14 mol %, preferably 4-11 mol %, more preferably 5-10 mol %, and still more preferably 6-9 mol % of a CHDM unit, and usually 7-30 mol %, preferably 10-25 mol %, more preferably 12-21 mol %, and still more preferably 15-20 mol % of an EG unit.

Here, the sum of the structural unit derived from the aromatic dihydroxy compound, the TPA unit, the CHDM unit, and the EG unit may be usually 80 mol % or more, preferably 90 mol % or more, more preferably 95 mol % or more, and still more preferably 97 mol % or more and 100 mol % or less.

The structural unit derived from the aromatic dihydroxy compound may be preferably a structural unit derived from bisphenol A (hereinafter sometimes abbreviated as "BPA unit").

Figure 3:
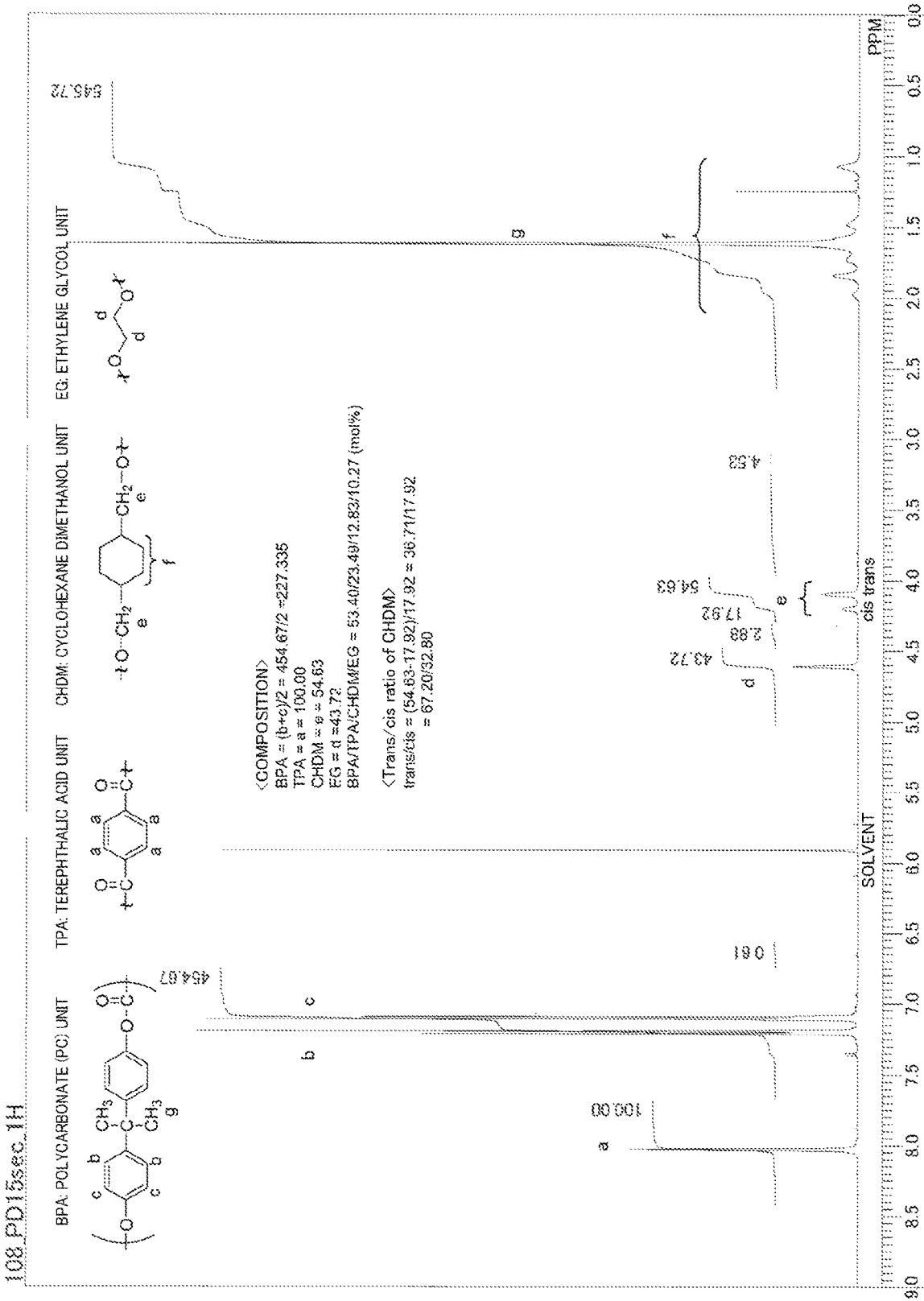
FIG. 3 is a $^1$H-NMR spectrum of an aromatic polycarbonate resin ($\beta$-1) used in Examples.

The content of the structural unit derived from each constituent monomer in the aromatic polycarbonate resin can be obtained by using $^1$H-NMR and $^{13}$C-NMR. The $^1$H-NMR spectrum can be measured, for example, by dissolving 15 mg of a sample in 0.6 mL of tetrachloroethane-d$_2$ solvent and using a 500 MHz nuclear magnetic resonance apparatus under the following conditions. FIG. 3 illustrates an example of measurement of the $^1$H-NMR spectrum of the aromatic polycarbonate resin (β-1) used in Examples described later.

Chemical shift reference: tetrachloroethane: 5.91 ppm
Measurement mode: single pulse
Pulse width: 45° (6.72 μs)
Number of points: 32 K
Measurement range: 15 ppm (−2.5 to 12.5 ppm)
Repeat time: 15.0 seconds
Number of integrations: 64 times
Measurement temperature: 25° C.
Window function: exponential (BF: 0.12 Hz)

The $^{13}$C-NMR spectrum can be measured, for example, by dissolving 60 mg of a sample in 0.6 mL of tetrachloroethane-d$_2$ solvent and using a 125 MHz nuclear magnetic resonance apparatus under the following conditions.

Chemical shift reference: automatic setting by apparatus
Measurement mode: single pulse proton broadband decoupling
Pulse width: 30° (3.70 μs)
Number of points: 32 K
Measurement range: 250 ppm (−25 to 225 ppm)
Repeat time: 3.0 seconds
Number of integrations: 15,000 times
Measurement temperature: 25° C.
Window function: exponential (BF: 1.00 Hz)

Peak attribution can be performed with reference to "Polymer Analysis Handbook (First edition, vol. 1, Sep. 20, 2008, Edited by the Polymer Analytical Council of Japan Analytical Chemistry, Asakura Shoten Co., Ltd.)" or "NMR database of Materials Information Station (National Institute for Materials Science and Technology, http://polymer.nims.go.jp/NMR/)", and the ratio of each structural unit in the aromatic polycarbonate resin can be calculated from the peak area ratio. The measurements of $^1$H-NMR and $^{13}$C-NMR can also be performed at an analytical institution such as Mitsui Chemical Analysis Center, Inc.

As the aromatic polycarbonate resin, one of these resins or a mixture of two or more thereof can be used. When the aromatic polycarbonate resin is the resin mixture containing two or more of the resins, the content of the structural unit derived from each constituent monomer as the mixture may be controlled to fall within the above-described range. Preferably, the content of the structural unit derived from each constituent monomer may be controlled to fall within the above-described range for each of the resins constituting the mixture.

As desired, the aromatic polycarbonate resin may contain a core-shell rubber as long as it does not contradict the purpose of the various embodiments. When the core-shell rubber is used in an amount of usually 0-30 parts by mass, and preferably 0-10 parts by mass, based on 100 parts by mass of the aromatic polycarbonate resin, the cutting processability and impact resistance can be enhanced.

Examples of the core-shell rubber include a methacrylic acid ester-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylic acid ester graft copolymer, a methacrylic acid ester/acrylic acid ester rubber graft copolymer, a methacrylic acid ester-styrene/acrylic acid ester rubber graft copolymer, and a methacrylic acid ester-acrylonitrile/acrylic acid ester rubber graft copolymer. As the core-shell rubber, one of these rubbers or a mixture of two or more thereof can be used.

As desired, as long as it does not contradict the purpose of the various embodiments, the aromatic polycarbonate resin can further contain: a thermoplastic resin other than the aromatic polycarbonate resin or the core-shell rubber; a pigment, an inorganic filler, an organic filler, or a resin filler; and an additive such as a lubricant, an antioxidant, a weather resistance stabilizer, a heat stabilizer, a release agent, an antistatic agent, and a surfactant. The blending amount of the optional component(s) is usually about 0.01 to 10 parts by mass based on 100 parts by mass of the aromatic polycarbonate resin.

The multilayer film of the various embodiments satisfies the following formulae (1-1) and (1-2).

$$(T\beta - T\alpha_1) \leq 30 \quad (1\text{-}1)$$

$$(T\beta - T\alpha_2) \leq 30 \quad (1\text{-}2)$$

Here, $T\alpha_1$ is the glass transition temperature of the first acrylic resin; $T\alpha_2$ is the glass transition temperature of the second acrylic resin; and $T\beta$ is the glass transition temperature of the aromatic polycarbonate resin. All of the temperatures are determined in ° C.

The term "glass transition temperature" as used in the present specification is a midpoint glass transition temperature calculated from a curve of a last temperature increase process measured by a program that uses a Diamond DSC type differential scanning calorimeter manufactured by Perkin Elmer Japan Co., Ltd., according to JIS K7121-1987, to be kept at 250° C. for 3 minutes, cooled to 20° C. at 10° C./min, kept at 20° C. for 3 minutes, and increases the temperature to 250° C. at 10° C./min.

From viewpoints of suppressing the warpage deformation of the multilayer film and improving the appearance, the ($T\beta-T\alpha_1$) value is usually 30° C. or lower, preferably 20° C. or lower, more preferably 15° C. or lower, and still more preferably 10° C. or lower. Meanwhile, the ($T\beta-T\alpha_1$) value may be usually −30° C. or higher, and preferably −15° C. or higher. In one embodiment, the ($T\beta-T\alpha_1$) value is −30° C. or higher and 30° C. or lower, −30° C. or higher and 20° C. or lower, −30° C. or higher and 15° C. or lower, −30° C. or higher and 10° C. or lower, −15° C. or higher and 30° C. or lower, −15° C. or higher and 20° C. or lower, −15° C. or higher and 15° C. or lower, or −15° C. or higher and 10° C. or lower.

Similarly, from viewpoints of suppressing the warpage deformation of the multilayer film and improving the appearance, the ($T\beta-T\alpha_2$) value is usually 30° C. or lower, preferably 20° C. or lower, more preferably 15° C. or lower, and still more preferably 10° C. or lower. Meanwhile, the ($T\beta-T\alpha_2$) value may be usually −30° C. or higher, and preferably −15° C. or higher. In one embodiment, the ($T\beta-T\alpha_2$) value is −30° C. or higher and 30° C. or lower, −30° C. or higher and 20° C. or lower, −30° C. or higher and 15° C. or lower, −30° C. or higher and 10° C. or lower, −15° C. or higher and 30° C. or lower, −15° C. or higher and 20° C. or lower, −15° C. or higher and 15° C. or lower, or −15° C. or higher and 10° C. or lower.

In the multilayer film of the various embodiments, the total light transmittance (measured according to JIS K7361-1:1997 by using a turbidimeter "NDH 2000" (trade name) manufactured by Nippon Denshoku Industries Co., Ltd.) may be preferably 85% or more, more preferably 88% or more, and still more preferably 90% or more. When the multilayer film of the various embodiments has a total light transmittance of 85% or more, it can be suitably used as an image display device member. A higher total light transmittance of the multilayer film is preferable.

The multilayer film of the various embodiments may have a retardation (measured by parallel Nicole rotation method with a retardation measurement device "KOBRA-WR" (trade name) manufactured by Oji Test Instrument Co., Ltd.) of usually 75 nm or less, preferably 50 nm or less, more preferably 40 nm or less, still more preferably 30 nm or less, yet still more preferably 20 nm or less, and most preferably 15 nm or less. When the multilayer film of the various embodiments has a retardation of 75 nm or less, it can be suitably used as an image display device member. A lower retardation of the multilayer film is preferable.

The multilayer film of the various embodiments may have a water absorption (measured according to test (iii) in Examples described later) of preferably 1 mass % or less, more preferably 0.7 mass % or less, still more preferably 0.6 mass % or less, and most preferably 0.5 mass % or less. When the multilayer film of the various embodiments has a water absorption of 1 mass % or less, it can be suitably used as an image display device member. A lower water absorption of the multilayer film is preferable.

The multilayer film of the various embodiments may have a yellowness index (measured according to JIS K7105:1981 by using a colorimeter "SolidSpec-3700" (trade name) manufactured by Shimadzu Corporation) of preferably 3 or less, more preferably 2 or less, and still more preferably 1 or less. When the multilayer film of the various embodiments has a yellowness index of 3 or less, it can be suitably used as an image display device member. A lower yellowness index of the multilayer film is preferable.

In one embodiment, the multilayer film of the various embodiments may have a total light transmittance of 85% or more, 88% or more or 90% or more, and/or a retardation of 75 nm or less, 50 nm or less, 40 nm or less, 30 nm or less, 20 nm or less, or 15 nm or less, and/or a water absorption of 1% by mass or less, 0.7% by mass or less, 0.6% by mass or less, or 0.5% by mass or less, and/or a yellowness index of 3 or less, 2 or less, or 1 or less.

2. Method for Producing Multilayer Film

The method for producing a multilayer film of the various embodiments is not particularly limited, and it can be produced by any method. Preferred examples of the method for producing a multilayer film according to the various embodiments include a method including (A) a step of continuously coextruding, from a T die, a molten film of a multilayer film in which a first acrylic resin layer ($\alpha 1$), an aromatic polycarbonate resin layer ($\beta$), and a second acrylic resin layer ($\alpha 2$) are directly laminated in the stated order by using a coextrusion apparatus provided with an extruder and the T die; (B) a step of feeding and pressing the molten film of the multilayer film between a first mirror-finished body that rotates or circulates and a second mirror-finished body that rotates or circulates so that the first acrylic resin layer ($\alpha 1$) is disposed on the first-mirror-finished-body side; and (C) a step of holding the multilayer film pressed in the step (B) against the first mirror-finished body and sending the pressed multilayer film to a subsequent third mirror-finished body that rotates or circulates.

The coextrusion apparatus used in the step (A) is not particularly limited, and any coextrusion apparatus can be used. Examples of the coextrusion apparatus include coextrusion apparatuses such as a feed block type, a multi-manifold type, and a stack plate type.

The T die used in the step (A) is not particularly limited, and any T die can be used. Examples of the T die include a manifold die, a fish tail die, and a coat hanger die.

From a viewpoint of stably performing the process of continuously coextruding the molten film of the multilayer film, the set temperature of the T die may be usually 240° C. or higher, and preferably 250° C. or higher. Meanwhile, from a viewpoint of suppressing the degradation of the resin, the set temperature of the T die may be usually 320° C. or lower, and preferably 300° C. or lower. The set temperature of the T die may be usually 240° C. or higher and 320° C. or lower, and preferably 240° C. or higher and 300° C. or lower, 250° C. or higher and 320° C. or lower, or 250° C. or higher and 300° C. or lower.

The extruder used in the step (A) is not particularly limited, and any extruder can be used. Examples of the extruder include a single screw extruder, a co-rotating twin screw extruder, and a counter-rotating twin screw extruder.

In order to suppress the degradation of the first acrylic resin, the aromatic polycarbonate resin, and the second acrylic resin, it is preferable to purge the inside of the extruder with nitrogen.

It is preferable to dry the first acrylic resin, the aromatic polycarbonate resin, and the second acrylic resin before being subjected to film formation. It is also preferable that these resins dried by a dryer are directly transported and introduced from the dryer to the extruder. The set temperature of the dryer is appropriately determined in consideration of the glass transition temperature of the resin to be dried. When the glass transition temperature is Tg (° C.), the set temperature of the dryer may be usually (Tg–70) to (Tg–10)° C., and preferably (Tg–40) to (Tg–10)° C. It is also preferable to provide a vacuum vent in the extruder usually at a position corresponding to a metering zone at the tip of a screw.

Examples of the first mirror-finished body include a mirror-finished roll and a mirror-finished belt. Examples of the second mirror-finished body include a mirror-finished roll and a mirror-finished belt.

The mirror-finished roll is a roll having a mirror-finished surface, and is made of a metal, a ceramic, or a silicone rubber or the like. For the purpose of protecting the surface of the mirror-finished roll from corrosion and scratches, chrome plating, iron-phosphorus alloy plating, or hard carbon treatment by a PVD method or a CVD method, or the like can be performed.

The mirror-finished belt is a seamless belt whose surface is mirror finished and is usually made of a metal. The mirror-finished belt is arranged, for example, to loop around a pair of belt rollers and circulate between them. For the purpose of protecting the surface of the mirror-finished belt from corrosion and scratches, chrome plating, iron-phosphorus alloy plating, or hard carbon treatment by a PVD method or a CVD method, or the like can be performed.

The mirror finishing is not limited and can be performed by any method. Examples of the mirror finishing include a method for polishing with fine abrasive grains so that the arithmetic mean roughness (Ra) of the surface of the mirror-finished body is preferably 100 nm or less, and more preferably 50 nm or less, and/or the ten-point mean roughness (Rz) is preferably 500 nm or less, and more preferably 250 nm or less.

Although not intended to be bound by theory, it can be considered that the molten film of the multilayer film is pressed between the first mirror-finished body and the second mirror-finished body so that the highly smooth surface states of the first mirror-finished body and the second mirror-finished body can be transferred to the film and defective portions such as die stripes are corrected.

The surface temperatures of the first mirror-finished body and the second mirror-finished body preferably satisfy the following formulae (2) to (4):

$$(T\alpha_1-15) \leq TR_1 \leq (T\alpha_1+10) \quad (2)$$

$$(T\alpha_2-25) \leq TR_2 < (T\alpha_2+5) \quad (3)$$

$$(T\beta-25) \leq TR_1 \quad (4)$$

Here, $TR_1$ is the surface temperature of the first mirror-finished body; $TR_2$ is the surface temperature of the second mirror-finished body; $T\alpha_1$ is the glass transition temperature of the first acrylic resin; $T\alpha_2$ is the glass transition temperature of the second acrylic resin; and $T\beta$ is the glass transition temperature of the aromatic polycarbonate resin. All of the temperatures are determined in ° C. The definition of the glass transition temperature and the measurement method thereof have been described above.

From a viewpoint of preventing the development on the (α1) layer of appearance faults (exfoliation marks) accompanying the peeling-off from the first mirror-finished body, the surface temperature of the first mirror-finished body may be usually $(T\alpha_1+10)°$ C. or less, preferably $(T\alpha_1+7)°$ C. or less, and more preferably $(T\alpha_1+5)°$ C. or less. Meanwhile, from a viewpoint of sufficiently alleviating the stress caused by the shear in the T die or the extensional deformation in air gap to suppress the warpage deformation, the surface temperature of the first mirror-finished body may be usually $(T\alpha_1-15)°$ C. or higher, preferably $(T\alpha_1-10)°$ C. or higher, and more preferably $(T\alpha_1-5)°$ C. or higher. The surface temperature of the first mirror-finished body may be usually $(T\alpha_1-15)°$ C. or higher and $(T\alpha_1+10)°$ C. or lower, preferably $(T\alpha_1-15)°$ C. or higher and $(T\alpha_1+7)°$ C. or lower, $(T\alpha_1-15)°$ C. or higher and $(T\alpha_1+5)°$ C. or lower, $(T\alpha_1-10)°$ C. or higher and $(T\alpha_1+10)°$ C. or lower, $(T\alpha_1-10)°$ C. or higher and $(T\alpha_1+7)°$ C. or lower, $(T\alpha_1-10)°$ C. or higher and $(T\alpha_1+5)°$ C. or lower, $(T\alpha_1-5)°$ C. or higher and $(T\alpha_1+10)°$ C. or lower, $(T\alpha_1-5)°$ C. or higher and $(T\alpha_1+7)°$ C. or lower, or $(T\alpha_1-5)°$ C. or higher and $(T\alpha_1+5)°$ C. or lower.

From a viewpoint of sufficiently alleviating the stress caused by the shear in the T die or the extensional deformation in air gap to suppress the warpage deformation, the surface temperature of the first mirror-finished body may be usually $(T\beta-25)°$ C. or higher, preferably $(T\beta-20)°$ C. or higher, more preferably $(T\beta-15)°$ C. or higher, and still more preferably $(T\beta-10)°$ C. or higher.

From a viewpoint of preventing the development on the (α2) layer of appearance faults (exfoliation marks) accompanying the peeling-off from the second mirror-finished body and from a viewpoint of enabling the step (C) to be satisfactorily performed, the surface temperature of the second mirror-finished body may be usually $(T\alpha_2+5)°$ C. or lower, and preferably $(T\alpha_2)°$ C. or lower. Meanwhile, from a viewpoint of sufficiently alleviating the stress caused by the shear in the T die or the extensional deformation in air gap to suppress the warpage deformation, the surface temperature of the second mirror-finished body may be usually $(T\alpha_2-25)°$ C. or higher, preferably $(T\alpha_2-15)°$ C. or higher, and more preferably $(T\alpha_2-10)°$ C. or higher. The surface temperature of the second mirror-finished body may be usually $(T\alpha_2-25)°$ C. or higher and $(T\alpha_2+5)°$ C. or lower, preferably $(T\alpha_2-25)°$ C. or higher and $(T\alpha_2)°$ C. or lower, $(T\alpha_2-15)°$ C. or higher and $(T\alpha_2+5)°$ C. or lower, $(T\alpha_2-15)°$ C. or higher and $(T\alpha_2)°$ C. or lower, $(T\alpha_2-10)°$ C. or higher and $(T\alpha_2+5)°$ C. or lower, or $(T\alpha_2-10)°$ C. or higher and $(T\alpha_2)°$ C. or lower.

It is more preferable that the following formula (5) is satisfied. This is because the multilayer film pressed in the step (B) is held against the first mirror-finished body and sent to the subsequent third mirror-finished body that rotates or circulates. It is more preferable to set $TR_1$ to be higher than $TR_2$ by 2° C. or higher.

$$TR_2 < TR_1 \quad (5)$$

In the step (C), the multilayer film pressed in the step (B) is held against the first mirror-finished body and sent to the subsequent third mirror-finished body that rotates or circulates.

The surface temperature of the third mirror-finished body is not particularly limited, but from a viewpoint of suppressing the warpage deformation of the multilayer film, the surface temperature of the third mirror-finished body preferably satisfies the following formula (6):

$$(T\beta-25) \leq TR_3 \quad (6)$$

Here, $TR_3$ is the surface temperature of the third mirror-finished body. All of the temperatures are determined in ° C.

The following formula (6) is preferably satisfied together with the above formulae (2)-(4), and the following formula (6) is more preferably satisfied together with the above formulae (2)-(5).

From a viewpoint of suppressing the warpage deformation of the multilayer film, the surface temperature of the third mirror-finished body may be usually $(T\beta-25)°$ C. or higher, preferably $(T\beta-20)°$ C. or higher, more preferably $(T\beta-15)°$ C. or higher, and still more preferably $(T\beta-10)°$ C. or higher. Meanwhile, from a viewpoint of preventing the development on the (α2) layer of appearance faults (exfoliation marks) accompanying the peeling-off from the third mirror-finished body, the surface temperature of the third mirror-finished body may be preferably $(T\alpha_2+5)°$ C. or lower, and more preferably $(T\alpha_2)°$ C. or lower. The surface temperature of the third mirror-finished body may be preferably $(T\beta-25)°$ C. or higher and $(T\alpha2+5)°$ C. or lower, $(T\beta-25)°$ C. or higher and $(T\alpha_2)°$ C. or lower, $(T\beta-20)°$ C. or higher and $(T\alpha_2+5)°$ C. or lower, $(T\beta-20)°$ C. or higher and $(T\alpha_2)°$ C. or lower, $(T\beta-15)°$ C. or higher and $(T\alpha_2+5)°$ C. or lower, $(T\beta-15)°$ C. or higher and $(T\alpha_2)°$ C. or lower, $(T\beta-10)°$ C. or higher and $(T\alpha_2+5)°$ C. or lower, or $(T\beta-10)°$ C. or higher and $(T\alpha_2)°$ C. or lower.

Figure 4:
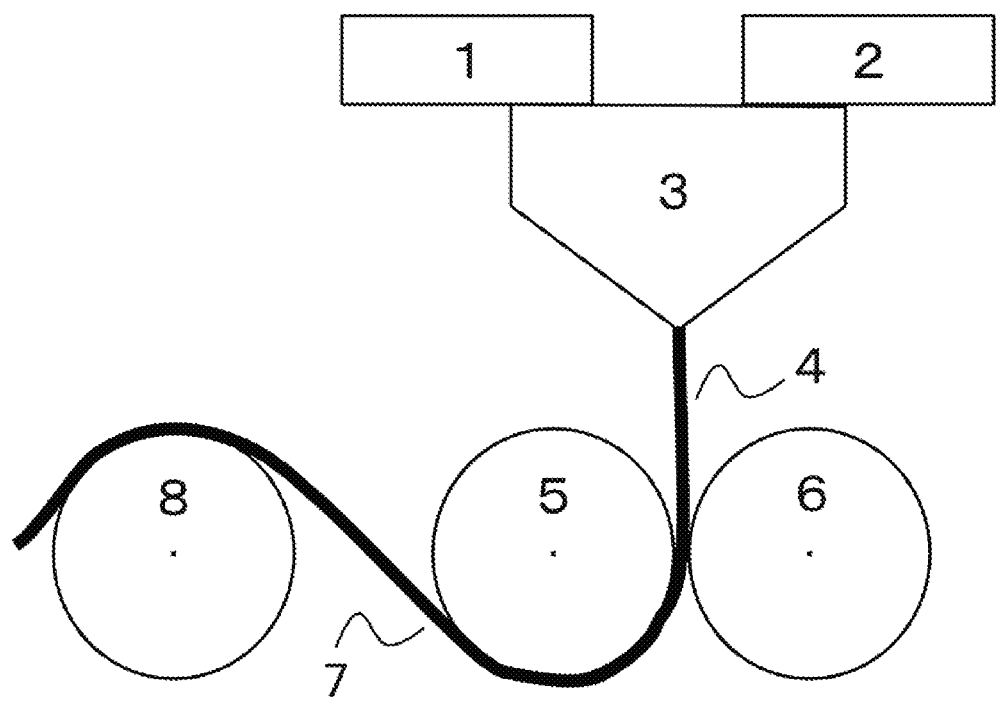
FIG. 4 is a conceptual diagram of a film forming apparatus used in Examples.

A non-limiting example of a preferred method for producing a multilayer film of the various embodiments will be further described with reference to FIG. 4. FIG. 4 is a conceptual diagram illustrating an example of an apparatus used in a production method of the various embodiments. The acrylic resin used as the first acrylic resin and the second acrylic resin (used for both the (α1) layer and the (α2) layer) is preferably sufficiently dried before being subjected to film formation, and then directly transported and introduced from the dryer to the extruder 1 for both outer layers. The aromatic polycarbonate resin is preferably sufficiently dried before being subjected to film formation, and then directly transported and introduced from the dryer to the extruder 2 for intermediate layer. As both outer layers (the (α1) layer and the (α2) layer), the acrylic resin introduced by the extruder 1 for both outer layers is continuously coextruded from a two-kind three-layer multi-manifold type coextrusion T-die 3, and as the intermediate layer (the (β) layer), the aromatic polycarbonate resin introduced by the extruder 2 for intermediate layer is continuously coextruded from the two-kind three-layer multi-manifold type coextrusion T-die 3.

The coextrusion T die 3 is usually set to 240° C. or higher, and preferably 250° C. or higher, and usually 320° C. or lower, and preferably 300° C. or lower. The extruder 1 for both outer layers and the extruder 2 for intermediate layer are preferably vacuum-vented in the metering zone at the tip of the screw. It is preferably purged with nitrogen.

The molten film 4 of the multilayer film in which the first acrylic resin layer (α1), the aromatic polycarbonate resin layer (β), and the second acrylic resin layer (α2) continuously coextruded from the coextrusion T die 3, which are directly laminated in the stated order, is fed and pressed between a rotating first mirror-finished roll 5 and a rotating second mirror-finished roll 6 so that the (α1) layer is disposed on the first mirror-finished roll 5 side. By these operations, it can be considered that the highly smooth surface states of the first mirror-finished roll 5 and the second mirror-finished roll 6 are transferred to the molten film 4 of the multilayer film, and defective portions such as die stripes are corrected.

The first mirror-finished roll 5 and the second mirror-finished roll 6 are usually arranged in a highly parallel and horizontal manner. Usually, the molten film 4 of the multilayer film extruded from the coextrusion T die 3 is conveyed substantially in the direction of gravitational force and usually contacts the first mirror-finished roll 5 and the second mirror-finished roll 6 at substantially the same time. That is, the angle between the vertical plane including the gap between the first mirror-finished roll 5 and the second mirror-finished roll 6 and the molten film 4 of the multilayer film may be usually less than 2°, preferably 1° or less, more preferably 0.5° or less, still more preferably 0.1° or less, and most preferably 0°.

As the first mirror-finished roll 5 and the second mirror-finished roll 6, those described above can be used.

The surface temperature of the first mirror-finished roll 5 is usually set to $(T\alpha+10)°$ C. or lower, preferably $(T\alpha+7)°$ C. or lower, and more preferably $(T\alpha+5)°$ C. or lower. Meanwhile, the surface temperature of the first mirror-finished roll 5 is usually set to $(T\beta-25)°$ C. or higher, preferably $(T\beta-20)°$ C. or higher, more preferably $(T\beta-15)°$ C. or higher, and still more preferably $(T\beta-10)°$ C. or higher. The surface temperature of the first mirror-finished roll 5 is usually set to $(T\alpha-15)°$ C. or higher, preferably $(T\alpha-10)°$ C. or higher, and more preferably $(T\alpha-5)°$ C. or higher.

The surface temperature of the second mirror-finished roll 6 is usually set to $(T\alpha+5)°$ C. or lower, and preferably to $(T\alpha)°$ C. or lower. Meanwhile, the surface temperature of the second mirror-finished roll 6 is usually set to $(T\alpha-25)°$ C. or higher, preferably $(T\alpha-15)°$ C. or higher, and more preferably $(T\alpha-10)°$ C. or higher. The surface temperature of the second mirror-finished roll 6 is set lower than the surface temperature of the first mirror-finished roll 5, and preferably set lower than the surface temperature of the first mirror-finished roll 5 by 2° C. or more.

Here, Tα is the glass transition temperature of the acrylic resin used as the first acrylic resin and the second acrylic resin, and Tβ is the glass transition temperature of the aromatic polycarbonate resin. The definition of the glass transition temperature and the measurement method thereof have been described above.

The molten film 4 of the multilayer film pressed by the first mirror-finished roll 5 and the second mirror-finished roll 6 is held against the first mirror-finished roll 5 and thereafter released from the first mirror-finished roll, and the released multilayer film 7 is then sent to the rotating third mirror-finished roll 8.

The surface temperature of the third mirror-finished roll is usually set to $(T\beta-25)°$ C. or higher, preferably $(T\beta-20)°$ C. or higher, more preferably $(T\beta-15)°$ C. or higher, and still more preferably $(T\beta-10)°$ C. or higher. Meanwhile, the surface temperature of the third mirror-finished roll is preferably set to $(T\alpha+5)°$ C. or lower, and more preferably $(T\alpha)°$ C. or lower.

3. Hard Coat Laminated Film

The hard coat laminated film of the various embodiments is a hard coat laminated film including a hard coat on at least one surface of the multilayer film of the various embodiments, and preferably on both surfaces from a viewpoint of suppressing warpage deformation.

The hard coat of the hard coat laminated film of the various embodiments is not particularly limited. Examples of the preferable hard coat include hard coats formed by using the techniques described in JP-B-5870222, JP-B-5963376, Japanese Patent Application No. 2016-006936, and Japanese Patent Application No. 2016-029588 and the like.

4. Article

Since the multilayer film of the various embodiments has preferred properties as described above, the multilayer film can be suitably used as an article or a member of the article. The article of the various embodiments is an article including the multilayer film or the hard coat laminated film of the various embodiments (including the member of the article). Examples of the article (including the member of the article) include: image display devices such as a liquid crystal display, a plasma display, and an electroluminescence display, and members thereof such as a display faceplate, a transparent conductive substrate, and a housing thereof; a television, a personal computer, a tablet type information device, and a smart phone, and members thereof such as a housing and a display faceplate thereof; a refrigerator, a washing machine, a cupboard, a costume shelf, and panels constituting them; a building window and a building door; a vehicle, a vehicle window, a windshield, a roof window, and an instrument panel; an electronic signage and a protective plate thereof; a show window; and a solar cell, and members thereof such as a housing and a front plate thereof.

In the production of the article of the various embodiments, in order to impart high designability to the obtained article, a decorative sheet may be laminated on the surface opposite to the front surface of the multilayer film or the hard coat laminated film of the various embodiments (in which the term "front surface" means the surface that is usually visually recognized when the article is practically used; hereinafter, the same also applies). This embodiment is particularly effective when the multilayer film and the hard coat laminated film of the various embodiments are used as a panel constituting a front surface of a door body for opening and closing a front portion of a main body of an article such as a refrigerator, a washing machine, a dish rack, or a costume shelf or the like, or when used as a panel constituting a plane of a lid body for opening and closing a flat portion of a main body of an article as exemplified above. The decorative sheet is not limited and any decorative sheet can be used. As the decorative sheet, for example, any colored resin sheet can be used.

Examples of the resin of the colored resin sheet include: polyester resins such as aromatic polyester and aliphatic polyester; acrylic resins; polycarbonate resins; poly(meth) acrylimide resins; polyolefin resins such as polyethylene, polypropylene, and polymethyl pentene; cellulose resins such as cellophane, triacetyl cellulose, diacetyl cellulose, and acetyl cellulose butyrate; styrene-based resins such as polystyrene, an acrylonitrile-butadiene-styrene copolymer resin (ABS resin), a styrene-ethylene-propylene-styrene copolymer, a styrene-ethylene-ethylene-propylene-styrene copolymer, and a styrene-ethylene-butadiene-styrene copolymer; polyvinyl chloride resins; polyvinylidene chloride resins; fluorine-containing resins such as polyvinylidene fluoride; and polyvinyl alcohol, ethylene vinyl alcohol, polyether ether ketone, nylon, polyamide, polyimide, polyurethane, polyether imide, polysulfone, and polyethersulfone and the like. These sheets include unstretched sheets, uniaxially stretched sheets, or biaxially stretched sheets. These sheets include a laminated sheet obtained by laminating two or more layers of one or more of the sheets.

The thickness of the colored resin sheet is not particularly limited, but it may be usually 20 μm or more, preferably 50 μm or more, and more preferably 80 μm or more. From a viewpoint of meeting the demand for reducing the thickness of the article, the thickness of the colored resin sheet may be usually 1,500 μm or less, preferably 800 μm or less, and more preferably 400 μm or less. In one embodiment, the thickness of the colored resin sheet may be usually 20 μm or more and 1500 μm or less, preferably 20 μm or more and 800 μm or less, 20 μm or more and 400 μm or less, 50 μm or more and 1500 μm or less, 50 μm or more and 800 μm or less, 50 μm or more and 400 μm or less, 80 μm or more and 1500 μm or less, 80 μm or more and 800 μm or less, or 80 μm or more and 400 μm or less.

A printed layer may be provided on the front side surface of the colored resin sheet, as desired, so as to enhance the sense of design. The printed layer is provided for imparting high designability, and may be formed by printing any pattern by using any ink and any printing machine.

The printing can be wholly or partially performed on the surface opposite to the front surface of the multilayer film or the hard coat laminated film of the various embodiments or/and on the front side surface of the colored resin sheet directly or via an anchor coat. Examples of the pattern include a metal tone pattern such as a hair line, a wood grain pattern, a stone pattern that simulates a surface of a rock such as marble, a cloth pattern that simulates a texture pattern or a cloth-like pattern, a tile sticker pattern, a brickwork pattern, a parquet pattern, and a patchwork. As the printing ink, a material in which a pigment, a solvent, a stabilizer, a plasticizer, a catalyst, and a curing agent and the like are appropriately mixed with a binder can be used. As the binder, for example, there can be used resins such as a polyurethane resin, a vinyl chloride-vinyl acetate copolymer resin, a vinyl chloride-vinyl acetate-acrylic copolymer resin, a chlorinated polypropylene resin, an acrylic resin, a polyester resin, a polyamide resin, a butyral resin, a polystyrene-based resin, a nitrocellulose-based resin, and a cellulose acetate resin, and resin compositions thereof. In order to apply metallic design, aluminum, tin, titanium, indium, and oxides thereof and the like may be wholly or partly vapor deposited by a known method on the surface opposite to the front surface of the multilayer film or the hard coat laminated film of the various embodiments and/or on the front side surface of the colored resin sheet directly or via an anchor coat.

The laminating of the multilayer film or the hard coat laminated film of the various embodiments and the decorative sheet is not particularly limited and can be performed by any method. Examples of the above-described method include: a dry laminating method using a known adhesive; and a method for forming a layer made of a known pressure-sensitive adhesive and then superposing and pressing both components.

EXAMPLES

Hereinafter, the various embodiments will be described with reference to Examples, but the various embodiments is not limited thereto.

Measurement Methods (i) Total Light Transmittance

The total light transmittance of a multilayer film was measured according to JIS K7361-1:1997 by using a turbidimeter "NDH 2000" (trade name) manufactured by Nippon Denshoku Industries Co., Ltd.

(ii) Retardation

The retardation of a multilayer film was measured according to a parallel Nicole rotation method by using a retardation measurement device "KOBRA-WR" (trade name) manufactured by Oji Scientific Instruments Co., Ltd.

(iii) Water Absorption (Mass Percentage of Absorbed Water)

The water absorption was measured according to an A method of JIS K7209:2009 by using a square (50 mm in a machine direction×50 mm in a lateral direction) test piece taken from a multilayer film under the condition of an immersion time of 24 hours.

(iv) Warpage Deformation

For three portions of a multilayer film, which are the central portion in the lateral direction, the left end portion, and the right end portion, samples with 15 cm in a machine direction and 7 cm in a lateral direction were taken from the total of 15 places in 5 places every 10 m in the machine direction of the film and processed at a temperature of 85° C. and a relative humidity of 85% for 16 hours, and the raised height due to the warpage deformation at the four corners was measured when the sample was placed on a horizontal plane with the convex warped surface facing downward. In the table of results, the worst (the floating height due to warpage deformation is the largest) among the four corners of each of the 15 samples was recorded as a measurement result.

This measurement result is evaluated according to the following criteria. The floating height due to warpage deformation may be preferably 15 mm or less, more preferably 8 mm or less, still more preferably 5 mm or less, and most preferably 3 mm or less. A smaller warpage deformation is preferable.

(v) Yellowness Index

The yellowness index of a multilayer film was measured according to JIS K7105:1981 by using a colorimeter "SolidSpec-3700" (trade name) manufactured by Shimadzu Corporation.

(vi) Surface Appearance

The film surface (for each of both surfaces) was visually observed while varying the angle of incidence of light of a fluorescent lamp and evaluated according to the following criteria.

⊚ (Very good): There are no undulations or flaws on the surface. Even if seen through with the light in the immediate vicinity, there is no cloudy feeling.

○ (Good): When looking at close, it is possible to slightly recognize undulations and flaws on the surface. When seen through with the light in the immediate vicinity, there is slight cloudy feeling.

Δ (Slightly poor): Undulations and flaws can be observed on the surface. There is also cloudy feeling.

x (Poor): Many undulations and flaws can be observed on the surface. There is also obvious cloudy feeling.

Raw Materials Used (α) Acrylic Resin (α-1) An acrylic resin comprised of a structural unit derived from methyl methacrylate in an amount of 76.8 mol % and a structural unit derived from vinylcyclohexane in an amount of 23.2 mol % based on 100 mol % of the total sum of structural units derived from polymerizable monomers. The content of each structural unit was measured by $^1$H-NMR. Glass transition temperature: 117° C.

(α-2) Poly(meth)acrylic imide "PLEXIMID TT 50" (trade name) manufactured by Evonik. Glass transition temperature: 150° C.

(β) Aromatic polycarbonate resin (β-1) A product of ester exchange obtained by melt-kneading a composition containing 71 parts by mass of the following (β1-1) and 29 parts by mass of the following (β2-1) at a die outlet resin temperature of 275° C. using a twin screw extruder. For the content of each structural unit measured using $^1$H-NMR, the contents of a BPA unit, a TPA unit, a CHDM unit, and an EG unit were 53.4 mol %, 23.5 mol %, 12.8 mol %, and 10.3 mol %, respectively, based on 100 mol % of the total sum of structural units derived from all constitutional monomers. Glass transition temperature: 122° C.

(β-2) A product of ester exchange obtained by melt-kneading a composition containing 60 parts by mass of the following (β1-1) and 40 parts by mass of the following (β2-2) at a die outlet resin temperature of 275° C. using a twin screw extruder. For the content of each structural unit measured using $^1$H-NMR, the contents of a BPA unit, a TPA unit, a CHDM unit, an EG unit, and a structural unit derived from diethylene glycol were 39.1 mol %, 30.4 mol %, 9.5 mol %, 19.7 mol %, and 1.3 mol %, respectively, based on 100 mol % of the total sum of structural units derived from all constitutional monomers. Glass transition temperature: 117° C.

(β-3) A product of ester exchange obtained by melt-kneading a composition containing 80 parts by mass of the following (β1-1) and 20 parts by mass of the following (β2-2) at a die outlet resin temperature of 275° C. using a twin screw extruder. For the content of each structural unit measured using $^1$H-NMR, the contents of a BPA unit, a TPA unit, a CHDM unit, an EG unit, and a structural unit derived from diethylene glycol were 63.1 mol %, 18.4 mol %, 5.7 mol %, 11.9 mol %, and 0.8 mol %, respectively, based on 100 mol % of the total sum of structural units derived from all constitutional monomers. Glass transition temperature: 131° C.

(β-4) A product of ester exchange obtained by melt-kneading a composition containing 90 parts by mass of the following (β1-1) and 10 parts by mass of the following (β2-1) at a die outlet resin temperature of 275° C. using a twin screw extruder. For the content of each structural unit measured using $^1$H-NMR, the contents of a BPA unit, a TPA unit, a CHDM unit, and an EG unit were 80.8 mol %, 9.6 mol %, 5.3 mol %, and 4.3 mol %, respectively, based on 100 mol % of the total sum of structural units derived from all constitutional monomers. Glass transition temperature: 143° C.

(β-5) A product of ester exchange obtained by melt-kneading a composition containing 70 parts by mass of the following (β1-1) and 30 parts by mass of the following (β2-3) at a die outlet resin temperature of 275° C. using a twin screw extruder. For the content of each structural unit measured using $^1$H-NMR, the contents of a BPA unit, a TPA unit, a CHDM unit, and a structural unit derived from 2,2,4,4-tetramethyl-1,3-cyclobutanediol were 55.8 mol %, 22.1 mol %, 17.1 mol %, and 5.0 mol %, respectively, based on 100 mol % of the total sum of structural units derived from all constitutional monomers. Glass transition temperature: 142° C.

(β1) Polycarbonic acid ester of bisphenol A:

(β1-1) "Caliber 301-4" (trade name) manufactured by Sumika Styron Polycarbonate Limited. Glass transition temperature: 151° C.

(β2) Amorphous or low-crystalline aromatic polyester resin:

(β2-1) A glycol-modified polyethylene terephthalate comprised of 100.0 mol % of a structural unit derived from terephthalic acid based on 100 mol % of the total sum of structural units derived from polycarboxylic acid, and 55.2 mol % of a structural unit derived from 1,4-cyclohexanedimethanol and 44.8 mol % of a structural unit derived from ethylene glycol based on 100 mol % of the total sum of structural units derived from polyol. Glass transition temperature: 85° C., heat of fusion: 9 J/g.

(β2-2) A glycol-modified polyethylene terephthalate comprised of 100.0 mol % of a structural unit derived from terephthalic acid based on 100 mol % of the total sum of structural units derived from polycarboxylic acid, and 31.1 mol % of s structural unit derived from 1,4-cyclohexanedimethanol, 64.7 mol % of a structural unit derived from ethylene glycol, and 4.2 mol % of a structural unit derived from diethylene glycol based on 100 mol % of the total sum of structural units derived from polyol. Glass transition temperature: 81° C., heat of fusion: 0 J/g (no clear melting peak in the DSC second melting curve).

(β2-3) A polyester copolymer comprised of 100.0 mol % of a structural unit derived from terephthalic acid based on 100 mol % of the total sum of structural units derived from polycarboxylic acid, and 77.4 mol % of a structural unit derived from 1,4-cyclohexanedimethanol and 22.6 mol % of a structural unit derived from 2,2,4,4-tetramethyl-1,3-cyclobutanediol based on 100 mol % of the total sum of structural units derived from polyol. Glass transition temperature: 110° C., heat of fusion: 0 J/g (no clear melting peak in the DSC second melting curve).

Example 1

(A) A coextrusion apparatus having a configuration illustrated as the conceptual view in FIG. 4 was used. The (α-1) was used as both outer layers (the (α1) layer and the (α2) layer) by an extruder 1 for both outer layers and the (β-1) was used as an intermediate layer by an extruder 2 for intermediate layer. A molten film 4 of a multilayer film in which the (α1) layer, the (β) layer, and the (α2) layer were directly laminated in the stated order was continuously coextruded from a two-kind three-layer multi-manifold type coextrusion T die 3.

(B) The molten film 4 of the multilayer film was fed and pressed between a rotating first mirror-finished roll 5 and a rotating second mirror-finished roll 6 so that the (α1) layer was disposed on the first mirror-finished roll 5 side.

(C) The pressed multilayer film was held against the first mirror-finished roll 5 and sent to a subsequent rotating third mirror-finished roll 8 to obtain a multilayer film in which a total thickness was 250 μm; a layer thickness of the (α1) layer was 60 μm; a layer thickness of the (β) layer was 130 μm; and a layer thickness of the (α2) layer was 60 μm. At this time, the temperature of the coextrusion T die was 270° C.; the surface temperature (TR1) of the first mirror-finished roll was 120° C.; the surface temperature (TR2) of the second mirror-finished roll was 115° C.; and the surface temperature (TR3) of the third mirror-finished roll was 120° C. A take-over speed was 6.5 m/min.

The tests (i)-(vi) were performed. The results are shown in Table 1.

Example 2

The formation of a multilayer film and the measurement and evaluation of physical properties of the multilayer film were performed in the same manner as in Example 1 except that the (β-2) was used in place of the (β-1). The results are shown in Table 1.

Example 3

The formation of a multilayer film and the measurement and evaluation of physical properties of the multilayer film were performed in the same manner as in Example 1 except that the (β-3) was used in place of the (β-1). The results are shown in Table 1.

Example 4

The formation of a multilayer film and the measurement and evaluation of physical properties of the multilayer film were performed in the same manner as in Example 1 except that the (β-4) was used in place of the (β-1). The results are shown in Table 1.

Example 4-2

The formation of a multilayer film and the measurement and evaluation of physical properties of the multilayer film were performed in the same manner as in Example 1 except that the (β1-1) was used in place of the (β-1). The results are shown in Table 1.

Example 4-3

The formation of a multilayer film and the measurement and evaluation of physical properties of the multilayer film were performed in the same manner as in Example 1 except that the (β-5) was used in place of the (β-1). The results are shown in Table 1.

Example 5

The formation of a multilayer film and the measurement and evaluation of physical properties of the multilayer film were performed in the same manner as in Example 1 except that the (α-2) was used in place of the (α-1); the (β-4) was used in place of the (β-1); the surface temperature of a first mirror-finished roll was set to 145° C.; the surface temperature of a second mirror-finished roll was set to 140° C.; and the surface temperature of a third mirror-finished roll was set to 140° C. The results are shown in Table 1.

Examples 6 to 10

The formation of a multilayer film and the measurement and evaluation of physical properties of the multilayer film were performed in the same manner as in Example 1 except that the surface temperatures of first, second, and third mirror-finished rolls were changed as shown in Table 1. The results are shown in Table 1.

TABLE 1

|  |  | Ex. 1 | Ex. 2 | Ex. 3 | Ex.4 | Ex. 4-2 | Ex. 4-3 | Ex. 5 | Ex. 6 | Ex. 7 | Ex. 8 | Ex. 9 | Ex. 10 |
|---|---|---|---|---|---|---|---|---|---|---|---|---|---|
| Layer | α1 | α-1 | α-1 | α-1 | α-1 | α-1 | α-1 | α-2 | α-1 | α-1 | α-1 | α-1 | α-1 |
| Structure | β | β-1 | β-2 | β-3 | β-4 | β1-1 | β-5 | β-4 | β-1 | β-1 | β-1 | β-1 | β-1 |
|  | α2 | α-1 | α-1 | α-1 | α-1 | α-1 | α-1 | α-2 | α-1 | α-1 | α-1 | α-1 | α-1 |
| Film formation conditions | TR1° C. | 120 | 120 | 120 | 120 | 120 | 120 | 145 | 120 | 115 | 130 | 127 | 105 |
|  | TR2° C. | 115 | 115 | 115 | 115 | 115 | 115 | 140 | 100 | 110 | 115 | 125 | 100 |
|  | TR3° C. | 120 | 120 | 120 | 120 | 120 | 120 | 140 | 120 | 115 | 120 | 120 | 105 |
|  | Tα1° C. | 117 | 117 | 117 | 117 | 117 | 117 | 150 | 117 | 117 | 117 | 117 | 117 |
|  | Tα2° C. | 117 | 117 | 117 | 117 | 117 | 117 | 150 | 117 | 117 | 117 | 117 | 117 |
|  | Tβ° C. | 122 | 117 | 131 | 143 | 151 | 138 | 143 | 122 | 122 | 122 | 122 | 122 |
| Evaluations results | Total light transmittance % | 93 | 93 | 93 | 93 | 93 | 93 | 92 | 93 | 93 | 93 | 93 | 93 |
|  | Retardation nm | 8 | 8 | 9 | 9 | 9 | 10 | 8 | 7 | 8 | 9 | 8 | 10 |
|  | Water absorption % | 0.34 | 0.33 | 0.36 | 0.35 | 0.35 | 0.37 | 1.53 | 0.33 | 0.36 | 0.38 | 0.40 | 0.35 |
|  | Warpage deformation mm | 2 | 2 | 4 | 14 | 20 | 9 | 2 | 3 | 2 | 3 | 2 | 15 |
|  | Yellowness index | 0.3 | 0.3 | 0.3 | 0.3 | 0.3 | 0.3 | 0.3 | 0.3 | 0.3 | 0.3 | 0.3 | 0.3 |
|  | Surface appearance | ◎ | ◎ | ◎ | ◎ | ◎ | ◎ | ◎ | ○ | ◎ | × | × | ○ |

From these results, it was found that the multilayer films according to the various embodiments had suppressed warpage deformation after moisture and heat treatment. It was also found that the multilayer films according to the various embodiments, which were produced by a preferred method, had suppressed warpage deformation after moisture and heat treatment, a low water absorption, excellent transparency, excellent color tone, an excellent appearance, and a small retardation.

REFERENCE SIGNS LIST

1 Extruder for both outer layers
2 Extruder for intermediate layer
3 Two-kind three-layer multi-manifold type coextrusion T die
4 Molten film of multilayer film extruded from T die
5 First mirror-finished roll
6 Second mirror-finished roll
7 Multilayer film sent from first mirror-finished roll to third mirror-finished body
8 Third mirror-finished roll

The invention claimed is:

1. A multilayer film comprising:
a first acrylic resin layer ($\alpha 1$);
an aromatic polycarbonate resin layer ($\beta$); and
a second acrylic resin layer ($\alpha 2$),
wherein the first acrylic resin layer ($\alpha 1$), the aromatic polycarbonate resin layer ($\beta$), and the second acrylic resin layer ($\alpha 2$) are directly laminated in the stated order, an aromatic polycarbonate resin constituting the aromatic polycarbonate resin layer ($\beta$) is a product of ester exchange between a polycarbonic acid ester of an aromatic dihydroxy compound and a low-crystalline or amorphous aromatic polyester, and the multilayer film satisfies the following formulae (1-1) and (1-2):

$$(T\beta - T\alpha_1) \leq 30 \quad (1\text{-}1)$$

$$(T\beta - T\alpha_2) \leq 30 \quad (1\text{-}2),$$

wherein $T\alpha_1$ is a glass transition temperature of an acrylic resin constituting the first acrylic resin layer ($\alpha 1$), $T\alpha_2$ is a glass transition temperature of an acrylic resin constituting the second acrylic resin layer ($\alpha 2$), $T\beta$ is a glass transition temperature of an aromatic polycarbonate resin constituting the aromatic polycarbonate resin layer ($\beta$), and all of the temperatures are determined in ° C., and
wherein the acrylic resin constituting the first acrylic resin layer ($\alpha 1$) and the acrylic resin constituting the second acrylic resin layer ($\alpha 2$) are the same acrylic resin, and the acrylic resin consists of
a structural unit derived from methyl (meth)acrylate in an amount of 50-95 mol %, and
a structural unit derived from vinylcyclohexane in an amount of 50-5 mol % based on 100 mol % of the total sum of structural units derived from polymerizable monomers, or a poly(meth)acrylimide resin.

2. The multilayer film according to claim 1, wherein the glass transition temperature of the aromatic polycarbonate resin constituting the aromatic polycarbonate resin layer ($\beta$) is 100-140° C.

3. The multilayer film according to claim 1, wherein the polycarbonic acid ester of the aromatic dihydroxy compound is a polycarbonic acid ester of bisphenol A.

4. The multilayer film according to claim 1, wherein the low-crystalline or amorphous aromatic polyester is comprised of:

(1) a structural unit derived from terephthalic acid in an amount of 90-100 mol % based on 100 mol % of the total sum of structural units derived from polycarboxylic acid; and
(2) a structural unit derived from ethylene glycol in an amount of 20-80 mol %, a structural unit derived from 1,4-cyclohexanedimethanol in an amount of 20-80 mol %, and a structural unit derived from diethylene glycol in an amount of 0-10 mol % based on 100 mol % of the total sum of structural units derived from polyol.

5. The multilayer film according to claim 1, wherein the multilayer film satisfies the following formulae (1-1'), (1-2'), and (1-3):

$$(T\beta - T\alpha_1) \leq 20 \quad (1\text{-}1')$$

$$(T\beta - T\alpha_2) \leq 20 \quad (1\text{-}2')$$

$$T\beta \leq 140 \quad (1\text{-}3).$$

6. The multilayer film according to claim 1, wherein the aromatic polycarbonate resin constituting the aromatic polycarbonate resin layer ($\beta$) is the product of ester exchange between the polycarbonic acid ester of the aromatic dihydroxy compound and the low-crystalline or amorphous aromatic polyester in the presence of an ester exchange reaction catalyst.

7. The multilayer film according to claim 1, wherein the multilayer film satisfies the following properties (i) and (ii):
(i) a total light transmittance is 85% or more; and
(ii) a retardation is 75 nm or less.

8. The multilayer film according to claim 7, wherein the multilayer film further satisfies the following property (iii):
(iii) a water absorption measured under a condition of an immersion time of 24 hours is 1% by mass or less according to a method A in JIS K7209:2009.

9. A multilayer film comprising:
a first acrylic resin layer ($\alpha 1$);
an aromatic polycarbonate resin layer ($\beta$); and
a second acrylic resin layer ($\alpha 2$),
wherein the first acrylic resin layer ($\alpha 1$), the aromatic polycarbonate resin layer ($\beta$), and the second acrylic resin layer ($\alpha 2$) are directly laminated in the stated order, an aromatic polycarbonate resin constituting the aromatic polycarbonate resin layer ($\beta$) is comprised of a structural unit derived from an aromatic dihydroxy compound in an amount of 15-80.8 mol %, a structural unit derived from terephthalic acid in an amount of 9.6-42 mol %, a structural unit derived from 1,4-cyclohexanedimethanol in an amount of 3-25 mol %, and a structural unit derived from ethylene glycol in an amount of 4-30 mol % based on 100 mol % of the total sum of structural units derived from all constituent monomers, and the multilayer film satisfies the following formulae (1-1) and (1-2):

$$(T\beta - T\alpha_1) \leq 30 \quad (1\text{-}1)$$

$$(T\beta - T\alpha_2) \leq 30 \quad (1\text{-}2),$$

wherein $T\alpha_1$ is a glass transition temperature of an acrylic resin constituting the first acrylic resin layer ($\alpha 1$), $T\alpha_2$ is a glass transition temperature of an acrylic resin constituting the second acrylic resin layer ($\alpha 2$), $T\beta$ is a glass transition temperature of an aromatic polycarbonate resin constituting the aromatic polycarbonate resin layer ($\beta$), and all of the temperatures are determined in ° C.; and
wherein the acrylic resin constituting the first acrylic resin layer ($\alpha 1$) and the acrylic resin constituting the second acrylic resin layer (α2) are the same acrylic resin, and the acrylic resin consists of
   a structural unit derived from methyl (meth)acrylate in an amount of 50-95 mol %, and
   a structural unit derived from vinylcyclohexane in an amount of 50-5 mol % based on 100 mol % of the total sum of structural units derived from polymerizable monomers, or a poly(meth)acrylimide resin.

10. The multilayer film according to claim 9, wherein the aromatic polycarbonate resin constituting the aromatic polycarbonate resin layer (β) is comprised of
   a structural unit derived from bisphenol A in an amount of 15-80.8 mol %,
   a structural unit derived from terephthalic acid in an amount of 9.6-42 mol %,
   a structural unit derived from 1,4-cyclohexanedimethanol in an amount of 3-25 mol %, and
   a structural unit derived from ethylene glycol in an amount of 4-30 mol %
   based on 100 mol % of the total sum of the structural units derived from all constituent monomers.

11. The multilayer film according to claim 9, wherein the multilayer film satisfies the following properties (i) and (ii):
   (i) a total light transmittance is 85% or more; and
   (ii) a retardation is 75 nm or less.

12. The multilayer film according to claim 9, wherein the multilayer film satisfies the following formulae (1-1'), (1-2'), and (1-3):

$$(T\beta - T\alpha_1) \leq 20 \qquad (1\text{-}1')$$

$$(T\beta - T\alpha_2) \leq 20 \qquad (1\text{-}2')$$

$$T\beta \leq 140 \qquad (1\text{-}3).$$

13. The multilayer film according to claim 9, wherein the aromatic polycarbonate resin constituting the aromatic polycarbonate resin layer (β) is a product of ester exchange between a polycarbonic acid ester of the aromatic dihydroxy compound and a low-crystalline or amorphous aromatic polyester in the presence of an ester exchange reaction catalyst.

14. A hard coat laminated film comprising a hard coat on at least one surface of the multilayer film according to claim 1.

15. An article comprising the film according to claim 1.

16. A hard coat laminated film comprising a hard coat on at least one surface of the multilayer film according to claim 9.

17. An article comprising the film according to claim 9.

* * * * *